US009222056B2

(12) United States Patent
Firth et al.

(10) Patent No.: US 9,222,056 B2
(45) Date of Patent: Dec. 29, 2015

(54) METHODS OF REFINING NATURAL OILS, AND METHODS OF PRODUCING FUEL COMPOSITIONS

(75) Inventors: Bruce E. Firth, Buffalo Grove, IL (US); Sharon E. Kirk, New Lenox, IL (US)

(73) Assignee: Elevance Renewable Sciences, Inc., Woodridge, IL (US)

(*) Notice: Subject to any disclaimer, the term of this patent is extended or adjusted under 35 U.S.C. 154(b) by 950 days.

(21) Appl. No.: 13/335,601

(22) Filed: Dec. 22, 2011

(65) Prior Publication Data
US 2013/0006012 A1    Jan. 3, 2013

Related U.S. Application Data

(63) Continuation-in-part of application No. 12/901,829, filed on Oct. 11, 2010, now Pat. No. 8,957,268.

(60) Provisional application No. 61/250,743, filed on Oct. 12, 2009.

(51) Int. Cl.
*C10G 3/00* (2006.01)
*C07C 6/02* (2006.01)
(Continued)

(52) U.S. Cl.
CPC ... C11C 3/00 (2013.01); C10G 3/42 (2013.01); C10G 3/44 (2013.01); C10G 45/00 (2013.01);
(Continued)

(58) Field of Classification Search
CPC ............ C10G 3/00; C07C 6/00; C07C 6/02; C07C 6/04; C07C 6/06; C07C 6/08; C07C 67/00; C07C 67/02; C07C 1/20; C07C 1/213; C07C 1/36
USPC ......... 585/240, 250, 252, 254, 256, 310, 314, 585/324, 326, 500, 638, 639, 640, 643, 700, 585/708
See application file for complete search history.

(56) References Cited

U.S. PATENT DOCUMENTS 2,484,841 A * 10/1949 Lorand ............... 568/814
3,139,460 A *  6/1964 Eisenmann ........... 585/3
(Continued)

FOREIGN PATENT DOCUMENTS

EP     0167201 B2    11/1995
EP     0168091 B2    4/2003
(Continued)

OTHER PUBLICATIONS

Boelhouwer et al., "Metathesis of Fatty Acid Esters" in JAOCS, 61 (2) 425-429, Feb. 1984.*
(Continued)

*Primary Examiner* — In Suk Bullock
*Assistant Examiner* — Philip Louie
(74) *Attorney, Agent, or Firm* — Robert S. Dailey

(57) ABSTRACT

A method of refining a natural oil includes: (a) providing a feedstock that includes a natural oil; (b) reacting the feedstock in the presence of a metathesis catalyst to form a metathesized product that includes olefins and esters; (c) passivating residual metathesis catalyst with an agent selected from the group consisting of (i) a salt and/or an ester of a phosphorous oxo acid, (ii) a derivative of the phosphorous oxo acid in which at least one P—H bond has been replaced by a P—C bond, (iii) a salt and/or an ester of the derivative, and (iv) combinations thereof; (d) separating the olefins in the metathesized product from the esters in the metathesized product; and (e) transesterifying the esters in the presence of an alcohol to form a transesterified product and/or hydrogenating the olefins to form a fully or partially saturated hydrogenated product.

23 Claims, 5 Drawing Sheets

(51) Int. Cl.

| | | |
|---|---|---|
| C07C 67/02 | (2006.01) | |
| C07C 1/20 | (2006.01) | |
| C07C 1/213 | (2006.01) | |
| C11C 3/00 | (2006.01) | |
| C10G 45/00 | (2006.01) | |
| C10G 50/00 | (2006.01) | |
| C10G 65/04 | (2006.01) | |
| C10L 1/08 | (2006.01) | |
| C11B 3/00 | (2006.01) | |

(52) U.S. Cl.
CPC .............. *C10G 50/00* (2013.01); *C10G 65/043* (2013.01); *C10L 1/08* (2013.01); *C11B 3/00* (2013.01); *C11C 3/003* (2013.01); *C10G 2300/1014* (2013.01); *C10G 2300/1018* (2013.01); *C10G 2300/1088* (2013.01); *C10G 2300/30* (2013.01); *C10G 2300/301* (2013.01); *C10G 2300/307* (2013.01); *C10G 2300/308* (2013.01); *C10G 2300/44* (2013.01); *C10G 2300/705* (2013.01); *C10G 2300/802* (2013.01); *C10G 2400/02* (2013.01); *C10G 2400/06* (2013.01); *C10G 2400/08* (2013.01); *C10G 2400/20* (2013.01); *C10G 2400/22* (2013.01); *C10L 2200/043* (2013.01); *C10L 2200/0415* (2013.01); *C10L 2200/0446* (2013.01); *C10L 2200/0469* (2013.01); *C10L 2200/0476* (2013.01)

(56) References Cited

U.S. PATENT DOCUMENTS

| | | | |
|---|---|---|---|
| 3,150,205 | A | 9/1964 | Krane et al. |
| 3,351,566 | A | 11/1967 | Taylor et al. |
| 3,507,890 | A * | 4/1970 | Dieckelmann Gerhard et al. .............. 560/127 |
| 4,210,771 | A | 7/1980 | Holcombe |
| 4,465,890 | A | 8/1984 | Kukes et al. |
| 4,554,065 | A * | 11/1985 | Albinson et al. ............ 208/59 |
| 4,943,396 | A | 7/1990 | Johnson |
| 4,992,605 | A | 2/1991 | Craig et al. |
| 5,043,485 | A | 8/1991 | Fleckenstein et al. |
| 5,091,116 | A | 2/1992 | Krishnamurthy et al. |
| 5,095,169 | A | 3/1992 | Skeels et al. |
| 5,113,030 | A | 5/1992 | Chen et al. |
| 5,120,896 | A | 6/1992 | Kemp et al. |
| 5,146,033 | A | 9/1992 | Schrock et al. |
| 5,191,145 | A | 3/1993 | Allen et al. |
| 5,262,076 | A | 11/1993 | Ishida et al. |
| 5,264,606 | A | 11/1993 | Moloy et al. |
| 5,298,271 | A | 3/1994 | Takashina et al. |
| 5,342,909 | A | 8/1994 | Grubbs et al. |
| 5,348,755 | A | 9/1994 | Roy |
| 5,374,751 | A | 12/1994 | Cheng et al. |
| 5,391,385 | A | 2/1995 | Seybold |
| 5,399,731 | A * | 3/1995 | Wimmer .............. 554/167 |
| 5,401,866 | A | 3/1995 | Cheng et al. |
| 5,414,184 | A | 5/1995 | Wu et al. |
| 5,432,083 | A | 7/1995 | Copeland et al. |
| 5,484,201 | A | 1/1996 | Goolsbee |
| 5,532,163 | A | 7/1996 | Yagi et al. |
| 5,560,950 | A | 10/1996 | Conte et al. |
| 5,596,111 | A | 1/1997 | Sibi et al. |
| 5,597,600 | A | 1/1997 | Munson et al. |
| 5,653,966 | A | 8/1997 | Bertoli et al. |
| 5,672,802 | A | 9/1997 | Lutz |
| 5,675,051 | A | 10/1997 | Chauvin et al. |
| 5,747,409 | A | 5/1998 | Commereuc |
| 5,824,354 | A | 10/1998 | Ritter et al. |
| 5,840,942 | A | 11/1998 | Oude Alink |
| 5,864,049 | A | 1/1999 | Dos Santos et al. |
| 5,880,298 | A | 3/1999 | Hillion et al. |
| 5,883,272 | A | 3/1999 | Noweck et al. |
| 5,932,261 | A | 8/1999 | Unnithan |
| 5,939,572 | A | 8/1999 | Sibi et al. |
| 5,959,129 | A | 9/1999 | van Dam et al. |
| 5,972,057 | A | 10/1999 | Hayafuji et al. |
| 6,033,706 | A | 3/2000 | Silkeberg et al. |
| 6,075,158 | A | 6/2000 | Hill |
| 6,127,560 | A | 10/2000 | Stidham et al. |
| 6,127,561 | A | 10/2000 | Jeromin et al. |
| 6,129,945 | A | 10/2000 | Awad et al. |
| 6,162,480 | A | 12/2000 | van Buuren et al. |
| 6,172,248 | B1 | 1/2001 | Copeland et al. |
| 6,175,047 | B1 | 1/2001 | Hori et al. |
| 6,207,209 | B1 | 3/2001 | Jirjis et al. |
| 6,210,732 | B1 | 4/2001 | Papanton |
| 6,214,764 | B1 | 4/2001 | Gillespie |
| 6,215,019 | B1 | 4/2001 | Pederson et al. |
| 6,248,911 | B1 | 6/2001 | Canessa et al. |
| 6,251,460 | B1 | 6/2001 | Ganguli et al. |
| 6,265,495 | B1 | 7/2001 | Hirata et al. |
| 6,271,430 | B2 | 8/2001 | Schwab et al. |
| 6,284,852 | B1 | 9/2001 | Lynn et al. |
| 6,288,251 | B1 | 9/2001 | Tsuto et al. |
| 6,303,837 | B1 | 10/2001 | Gürtler et al. |
| 6,313,365 | B1 | 11/2001 | Hori et al. |
| 6,368,648 | B1 | 4/2002 | Bertram et al. |
| 6,376,581 | B1 | 4/2002 | Tanaka et al. |
| 6,388,038 | B1 | 5/2002 | Hirata et al. |
| 6,395,669 | B1 | 5/2002 | Sartain et al. |
| 6,409,778 | B1 | 6/2002 | Auschra et al. |
| 6,440,057 | B1 | 8/2002 | Ergün et al. |
| 6,492,564 | B1 | 12/2002 | Wiese et al. |
| 6,506,944 | B1 | 1/2003 | Schwab et al. |
| 6,552,139 | B1 | 4/2003 | Herrmann et al. |
| 6,552,208 | B1 | 4/2003 | Alander et al. |
| 6,583,236 | B1 | 6/2003 | Giardello et al. |
| 6,605,748 | B2 | 8/2003 | Wagener et al. |
| 6,638,551 | B1 | 10/2003 | Tazi et al. |
| 6,646,172 | B1 | 11/2003 | Schwab et al. |
| 6,677,495 | B1 | 1/2004 | Schwab et al. |
| 6,696,597 | B2 | 2/2004 | Pederson et al. |
| 6,706,299 | B2 | 3/2004 | Thengumpillil et al. |
| 6,740,134 | B2 | 5/2004 | Angelico et al. |
| 6,761,869 | B1 | 7/2004 | Virtanen |
| 6,800,316 | B1 | 10/2004 | Perrut et al. |
| 6,833,149 | B2 | 12/2004 | Jirjis et al. |
| 6,846,772 | B2 | 1/2005 | Lok et al. |
| 6,852,900 | B2 | 2/2005 | Wurziger et al. |
| 6,900,347 | B2 | 5/2005 | Paulson et al. |
| 6,916,448 | B2 | 7/2005 | Commereuc et al. |
| 6,960,272 | B1 | 11/2005 | Tokas et al. |
| 6,962,729 | B2 | 11/2005 | Tokas et al. |
| 6,982,155 | B1 | 1/2006 | Fukuda et al. |
| 6,998,050 | B2 | 2/2006 | Nakajoh et al. |
| 7,025,851 | B2 | 4/2006 | Caster et al. |
| 7,045,100 | B2 | 5/2006 | Ergün et al. |
| 7,045,114 | B2 | 5/2006 | Tonkovich et al. |
| 7,060,316 | B2 | 6/2006 | Sakai et al. |
| 7,067,584 | B2 | 6/2006 | Rink et al. |
| 7,119,216 | B2 | 10/2006 | Newman et al. |
| 7,141,083 | B2 | 11/2006 | Jordan |
| 7,144,433 | B2 | 12/2006 | Jordan |
| 7,144,435 | B2 | 12/2006 | Jordan |
| 7,160,338 | B2 | 1/2007 | Jordan |
| 7,160,339 | B2 | 1/2007 | Jordan |
| 7,176,336 | B2 | 2/2007 | Maughon et al. |
| 7,220,289 | B2 | 5/2007 | Jordan |
| 7,276,616 | B2 | 10/2007 | Dwyer et al. |
| 7,320,809 | B2 | 1/2008 | Friedman et al. |
| 7,361,621 | B2 | 4/2008 | Yang et al. |
| 7,431,749 | B2 | 10/2008 | Kim et al. |
| 7,442,248 | B2 | 10/2008 | Timmons |
| 7,449,591 | B2 | 11/2008 | Brenner et al. |
| 7,452,515 | B1 | 11/2008 | Lafleur et al. |
| 7,507,846 | B2 | 3/2009 | Pelly |
| 7,507,854 | B2 | 3/2009 | Lee et al. |
| 7,511,101 | B2 | 3/2009 | Nguyen et al. |
| 7,553,982 | B1 | 6/2009 | Morris |
| 7,563,915 | B2 | 7/2009 | Matson et al. |
| 7,576,227 | B2 | 8/2009 | Lysenko et al. |

(56) References Cited

U.S. PATENT DOCUMENTS

| | | |
|---|---|---|
| 7,585,990 B2 | 9/2009 | van Toor et al. |
| 7,597,783 B2 | 10/2009 | Kruidenberg |
| 7,598,407 B2 | 10/2009 | Kruidenberg |
| 7,601,309 B2 | 10/2009 | Krupa et al. |
| 7,612,221 B2 | 11/2009 | Haas et al. |
| 7,626,047 B2 | 12/2009 | Nakayama et al. |
| 7,626,048 B2 | 12/2009 | Soane et al. |
| 7,645,807 B1 | 1/2010 | Goetsch et al. |
| 7,652,145 B2 | 1/2010 | Herrmann et al. |
| 7,652,156 B2 | 1/2010 | Hillion et al. |
| 7,666,234 B2 | 2/2010 | Ghosh et al. |
| 7,671,224 B2 | 3/2010 | Winde et al. |
| 7,695,533 B2 | 4/2010 | Kovacs et al. |
| 7,696,376 B2 | 4/2010 | Furuta |
| 7,696,398 B2 | 4/2010 | Burdett et al. |
| 7,718,833 B2 | 5/2010 | Potthast et al. |
| 7,737,233 B2 | 6/2010 | Obrecht et al. |
| 7,743,828 B2 | 6/2010 | Roddy et al. |
| 7,745,652 B2 | 6/2010 | Lysenko et al. |
| 7,750,172 B2 | 7/2010 | Grubbs et al. |
| 7,790,651 B2 | 9/2010 | Lin et al. |
| 7,806,945 B2 | 10/2010 | Jackam et al. |
| 7,812,185 B2 | 10/2010 | Burdett et al. |
| 7,812,187 B2 | 10/2010 | Kawashima et al. |
| 7,838,711 B2 | 11/2010 | Herweck et al. |
| 7,846,995 B2 | 12/2010 | Ong et al. |
| 7,858,710 B2 | 12/2010 | Wagener et al. |
| 7,863,471 B2 | 1/2011 | Krause et al. |
| 7,875,736 B2 | 1/2011 | Wang et al. |
| 7,902,417 B2 | 3/2011 | Goldman et al. |
| 7,905,288 B2 | 3/2011 | Kinkead |
| 7,906,665 B2 | 3/2011 | Lin et al. |
| 7,939,688 B2 | 5/2011 | Meudt et al. |
| 7,951,967 B2 | 5/2011 | Chun et al. |
| 7,960,598 B2 | 6/2011 | Spilker et al. |
| 8,039,652 B2 | 10/2011 | Portnoff et al. |
| 8,039,653 B2 | 10/2011 | Soane et al. |
| 8,044,149 B2 | 10/2011 | Iwasaki et al. |
| 8,066,954 B2 | 11/2011 | Nguyen et al. |
| 8,071,799 B2 | 12/2011 | Olson |
| 8,147,766 B2 | 4/2012 | Spilker et al. |
| 8,148,477 B2 | 4/2012 | Saita et al. |
| 8,163,946 B2 | 4/2012 | Yan et al. |
| 8,192,696 B2 | 6/2012 | Gurski et al. |
| 8,207,362 B2 | 6/2012 | Morris |
| 8,227,371 B2 | 7/2012 | Holtcamp et al. |
| 8,227,635 B2 | 7/2012 | Bowden et al. |
| 8,237,003 B2 | 8/2012 | Holtcamp et al. |
| 8,293,181 B2 | 10/2012 | Saita et al. |
| 8,309,055 B2 | 11/2012 | Arstad et al. |
| 8,324,334 B2 | 12/2012 | Jones et al. |
| 8,324,413 B2 | 12/2012 | O'Rear |
| 8,334,396 B2 | 12/2012 | Papadogianakis et al. |
| 2003/0055184 A1* | 3/2003 | Song et al. .................. 526/160 |
| 2003/0135080 A1 | 7/2003 | Botha et al. |
| 2003/0236175 A1 | 12/2003 | Twu et al. |
| 2005/0070750 A1* | 3/2005 | Newman et al. ............. 585/643 |
| 2005/0080301 A1 | 4/2005 | Maughon et al. |
| 2005/0154221 A1* | 7/2005 | Lysenko et al. ............... 554/174 |
| 2005/0203324 A1* | 9/2005 | Lee et al. .................... 585/520 |
| 2006/0042158 A1 | 3/2006 | Lee |
| 2006/0047176 A1 | 3/2006 | Gartside et al. |
| 2006/0069274 A1 | 3/2006 | Dias De Moraes E Silva et al. |
| 2006/0167326 A1 | 7/2006 | Burdett et al. |
| 2007/0011943 A1 | 1/2007 | Lin |
| 2007/0151146 A1 | 7/2007 | Lee et al. |
| 2007/0179302 A1 | 8/2007 | Olivier-Bourbigou et al. |
| 2007/0208206 A1 | 9/2007 | Obrecht et al. |
| 2007/0217965 A1 | 9/2007 | Johnson et al. |
| 2007/0225536 A1 | 9/2007 | Lutz |
| 2007/0227400 A1 | 10/2007 | Zullo et al. |
| 2007/0277430 A1 | 12/2007 | Jackman et al. |
| 2008/0047194 A1 | 2/2008 | Prawoto |
| 2008/0097114 A1 | 4/2008 | Bakshi |
| 2008/0103346 A1 | 5/2008 | Burdett et al. |
| 2008/0115407 A1 | 5/2008 | Hoffman |
| 2008/0119664 A1 | 5/2008 | Sinoncelli et al. |
| 2008/0202021 A1 | 8/2008 | Powell |
| 2008/0228017 A1 | 9/2008 | Burdett et al. |
| 2008/0229654 A1* | 9/2008 | Bradin ........................ 44/308 |
| 2008/0244962 A1 | 10/2008 | Abhari et al. |
| 2008/0282606 A1 | 11/2008 | Plaza et al. |
| 2008/0300434 A1 | 12/2008 | Cortright et al. |
| 2008/0306230 A1 | 12/2008 | Pan et al. |
| 2009/0038209 A1 | 2/2009 | Farid et al. |
| 2009/0048459 A1 | 2/2009 | Tupy et al. |
| 2009/0069516 A1 | 3/2009 | Obrecht et al. |
| 2009/0112007 A1 | 4/2009 | Lin et al. |
| 2009/0143544 A1 | 6/2009 | Lysenko et al. |
| 2009/0145022 A1 | 6/2009 | Ng et al. |
| 2009/0163731 A1 | 6/2009 | Martin et al. |
| 2009/0165366 A1 | 7/2009 | Jovanovic et al. |
| 2009/0178330 A1 | 7/2009 | Lebron Parejo et al. |
| 2009/0183420 A1 | 7/2009 | Cobb |
| 2009/0203860 A1 | 8/2009 | Bergbreiter et al. |
| 2009/0264672 A1 | 10/2009 | Abraham et al. |
| 2009/0287004 A1 | 11/2009 | Bergman et al. |
| 2009/0306441 A1 | 12/2009 | Basset et al. |
| 2009/0307966 A1 | 12/2009 | Yan et al. |
| 2009/0324514 A1 | 12/2009 | Awad |
| 2009/0326295 A1 | 12/2009 | Krupa et al. |
| 2010/0010246 A1 | 1/2010 | Yan et al. |
| 2010/0018902 A1 | 1/2010 | Brownscombe et al. |
| 2010/0022789 A1 | 1/2010 | Mignani et al. |
| 2010/0037667 A1 | 2/2010 | Calderon et al. |
| 2010/0043280 A1 | 2/2010 | Morris |
| 2010/0047499 A1 | 2/2010 | Braksmayer et al. |
| 2010/0087671 A1 | 4/2010 | Lemke |
| 2010/0093944 A1 | 4/2010 | Müller et al. |
| 2010/0094034 A1 | 4/2010 | Kaido et al. |
| 2010/0107474 A1 | 5/2010 | Talwar et al. |
| 2010/0113719 A1 | 5/2010 | Patton et al. |
| 2010/0121087 A1 | 5/2010 | Banavali et al. |
| 2010/0130769 A1 | 5/2010 | Banavali et al. |
| 2010/0132252 A1 | 6/2010 | Nakazono |
| 2010/0140136 A1 | 6/2010 | Spilker et al. |
| 2010/0160506 A1 | 6/2010 | Wu et al. |
| 2010/0163459 A1 | 7/2010 | Odueyungbo |
| 2010/0166620 A1 | 7/2010 | Gurski et al. |
| 2010/0167910 A1 | 7/2010 | Odueyungbo |
| 2010/0191008 A1 | 7/2010 | Olson |
| 2010/0212219 A1 | 8/2010 | Siochi et al. |
| 2010/0212220 A1 | 8/2010 | Tirmizi |
| 2010/0223842 A1 | 9/2010 | Thesz et al. |
| 2010/0228042 A1 | 9/2010 | Chun et al. |
| 2010/0234625 A1 | 9/2010 | Papadogianakis et al. |
| 2010/0236984 A1 | 9/2010 | Brookhart et al. |
| 2010/0242348 A1 | 9/2010 | Chen et al. |
| 2010/0243961 A1 | 9/2010 | Hilton et al. |
| 2010/0252485 A1 | 10/2010 | Soane et al. |
| 2010/0263263 A1 | 10/2010 | O'Rear |
| 2010/0264015 A1 | 10/2010 | Portnoff et al. |
| 2010/0282467 A1 | 11/2010 | Hutchison et al. |
| 2010/0307051 A1 | 12/2010 | Tremblay et al. |
| 2010/0312012 A1 | 12/2010 | Hannen et al. |
| 2010/0331558 A1 | 12/2010 | Kao et al. |
| 2011/0015419 A1 | 1/2011 | Pendleton et al. |
| 2011/0015434 A1 | 1/2011 | Hannen et al. |
| 2011/0077360 A1 | 3/2011 | Obrecht et al. |
| 2011/0113679 A1 | 5/2011 | Cohen et al. |
| 2011/0160472 A1 | 6/2011 | Lemke et al. |
| 2011/0190524 A1 | 8/2011 | Winde et al. |
| 2011/0198535 A1 | 8/2011 | Meier et al. |
| 2011/0237850 A1 | 9/2011 | Luetkens, Jr. et al. |
| 2011/0252696 A1 | 10/2011 | Franklin et al. |
| 2011/0313180 A1 | 12/2011 | Uptain et al. |
| 2012/0009133 A1 | 1/2012 | Leonard et al. |
| 2012/0035392 A1 | 2/2012 | Kobayashi et al. |
| 2012/0077235 A1 | 3/2012 | Olson |
| 2012/0088943 A1 | 4/2012 | Knuuttila et al. |
| 2012/0116138 A1 | 5/2012 | Goodall et al. |
| 2012/0152723 A1 | 6/2012 | Yoneya |

(56) References Cited

U.S. PATENT DOCUMENTS

| | | |
|---|---|---|
| 2012/0165293 A1 | 6/2012 | Yiannikouros et al. |
| 2012/0165589 A1 | 6/2012 | Partington |
| 2012/0171090 A1 | 7/2012 | Chang |
| 2012/0178913 A1 | 7/2012 | Lin et al. |
| 2012/0190806 A1 | 7/2012 | Jakel et al. |
| 2012/0197031 A1 | 8/2012 | Firth et al. |
| 2012/0197032 A1 | 8/2012 | Firth et al. |
| 2012/0271019 A1 | 10/2012 | Drozdzak |
| 2012/0289729 A1 | 11/2012 | Holtcamp et al. |
| 2012/0329941 A1 | 12/2012 | Ong et al. |

FOREIGN PATENT DOCUMENTS

| | | | |
|---|---|---|---|
| EP | 1 728 844 | A1 | 12/2006 |
| JP | 05-004938 | A | 1/1993 |
| WO | WO 01/36368 | A2 | 5/2001 |
| WO | WO 01/83097 | A2 | 11/2001 |
| WO | WO 02/10114 | A2 | 2/2002 |
| WO | WO 02/076920 | A1 | 10/2002 |
| WO | WO 02/83742 | A2 | 10/2002 |
| WO | WO 2006/043281 | A1 | 4/2006 |
| WO | WO 2006/052688 | A2 | 5/2006 |
| WO | WO 2006/076364 | A2 | 7/2006 |
| WO | WO 2007/027669 | A1 | 3/2007 |
| WO | WO 2007/027955 | A2 | 3/2007 |
| WO | WO 2007/081987 | A2 | 7/2007 |
| WO | WO 2007081987 | A2 * | 7/2007 |
| WO | WO 2007/092632 | A2 | 8/2007 |
| WO | WO 2007/113530 | A2 | 10/2007 |
| WO | WO 2008/048520 | A1 | 4/2008 |
| WO | WO 2008/048522 | A1 | 4/2008 |
| WO | WO 2008/058664 | A1 | 5/2008 |
| WO | WO 2008/063322 | A2 | 5/2008 |
| WO | WO 2008/104929 | A1 | 9/2008 |
| WO | WO 2008/152371 | A1 | 12/2008 |
| WO | WO 2009/007234 | A1 | 1/2009 |
| WO | WO 2009/020665 | A1 | 2/2009 |
| WO | WO 2009/020667 | A1 | 2/2009 |
| WO | WO 2009/065229 | A1 | 5/2009 |
| WO | WO 2009/089591 | A1 | 7/2009 |
| WO | WO 2010/021740 | A1 | 2/2010 |
| WO | WO 2010/051268 | A1 | 5/2010 |
| WO | WO 2010/062958 | A1 | 6/2010 |
| WO | WO 2010/074738 | A1 | 7/2010 |
| WO | WO 2010/096549 | A2 | 8/2010 |
| WO | WO 2010/097519 | A2 | 9/2010 |
| WO | WO 2010/104844 | A2 | 9/2010 |
| WO | WO 2010/124030 | A1 | 10/2010 |
| WO | WO 2010/129051 | A1 | 11/2010 |
| WO | WO 2011/046872 | A2 | 4/2011 |
| WO | WO 2011/149789 | A1 | 12/2011 |
| WO | WO 2012/004489 | A1 | 1/2012 |

OTHER PUBLICATIONS

Sakamuri, "Esters" in Kirk-Othmer Encyclopedia of Chemical Technology, John Wiley & Sons, 2001, available on-line Dec. 19, 2003.*
Seador et al., "Distillation" in Perry's Chemical Engineers Handbook, R. H. Perry and D. W. Green, eds., McGraw-Hill, 7th ed., 1997, available on-line Mar. 1, 2001.*
Ann, Y. M.; Yang, K.; Georg, G. I. "A Convenient Method for the Efficient Removal of Ruthenium Byproducts Generated during Olefin Metathesis Reactions." Org. Lett., 2001, 3, 1411-1413.
Bourgeois, Damien et al., "The Cl$_2$(PCy3)(lMes)Ru(=CHPh) catalyst: olefin metathesis versus olefin isomerization," Journal of Organic Metallic Chemistry, vol. 643-644, 2002, pp. 247-252.
Cho, J. H.; Kim, B. M. "An Efficient Method for Removal of Ruthenium Byproducts from Olefin Metathesis Reactions." Org. Lett., 2003, 5, 531-533.
Cotton, F. A.; Wilkinson, G. Advanced Inorganic Chemistry, Fifth Edition, New York: John Wiley & Sons, 1988, pp. 382-443.
Formentín, P.; Gimeno, N.; Steinke, J. H. G.; Vilar, R. "Reactivity of Grubbs' Catalysts with Urea- and Amide-Substituted Olefins. Metathesis and Isomerization." J. Org. Chem., 2005, 70, 8235-8238.
Galan, B. R.; Kalbarczyk, K. P.; Szczepankiewicz, S.; Keister, J. B.; Diver, Steven T. "A Rapid and Simple Cleanup Procedure for Metathesis Reactions." Org. Lett., 2007, 9, 1203-1206.
Gimeno, N.; Formentín, P.; Steinke, J. H. G.; Vilar, R. "Phenylphosphoric Acid as a New Additive to Inhibit Olefin Isomerization in Ruthenium-Catalyzed Metathesis Reactions." Eur. J. Org. Chem., 2007, 918-924.
Hong, S. H.; Sanders, D. P.; Lee, C. W.; Grubbs, R. H. "Prevention of Undesirable Isomerization During Olefin Metathesis." J. Am. Chem. Soc., 2005, 127, 17160-17161.
James, B. R.; Lorenzini, F. "Developments in the Chemistry of Tris(hydroxymethyl)phosphine." Coordination Chemistry Reviews, 2010, 254, 420-430.
Knight, D. W.; Morgan, I. R.; Proctor, A. J. "A Simple Oxidative Procedure for the Removal of Ruthenium Residues from Metathesis Reaction Products." Tetrahedron Letters, 2010, 51, 638-640.
Maynard, H. D.; Grubbs, R. H. "Purification Technique for the Removal of Ruthenium from Olefin Metathesis Reaction Products." Tetrahedron Letters, 1999, 40, 4137-4140.
McEleney, K.; Allen, D. P.; Holliday, A. E.; Crudden, C. M. "Functionalized Mesoporous Silicates for the Removal of Ruthenium from Reaction Mixtures." Org. Lett., 2006, 8, 2663-2666.
Paquette, L. A.; Schloss, J. D.; Efremov, I.; Fabris, F.; Gallou, F.; Mendez-Andino, J.; Yang, J. "A Convenient Method for Removing All Highly-Colored Byproducts Generated during Olefin Metathesis Reactions," Org. Lett, 2000, 2, 1259-1261.
Pederson, R. L.; Fellows, I. M.; Ung, T. A.; Ishihara, H.; Hajela, S. P. "Applications of Olefin Cross Metathesis to Commercial Products." Advanced Synthesis & Catalysis, 2002, 344, 728-735.
Wang, H.; Goodman, S. N.; Dai, Q.; Stockdale, G. W.; Clark, W. M. "Development of a Robust Ring-Closing Metathesis Reaction in the Synthesis of SB-462795, a Cathepsin K Inhibitor," Organic Process Research & Development, 2008, 12, 226-234.
U.S. Appl. No. 12/672,652, filed Sep. 7, 2011 Entitled "Thermal Methods for Treating a Metathesis Feedstock".
U.S. Appl. No. 12/672,651, filed Sep. 7, 2011 Entitled "Chemical Methods for Treating a Metathesis Feedstock".
U.S. Appl. No. 13/335,466, entitled "Methods for Suppressing Isomerization of Olefin Metathesis Products" filed Dec. 22, 2011.
U.S. Appl. No. 13/335,495, entitled "Methods for Suppressing Isomerization of Olefin Metathesis Products" filed Dec. 22, 2011.
U.S. Appl. No. 13/335,517, entitled "Methods for Suppressing Isomerization of Olefin Metathesis Products" filed Dec. 22, 2011.
U.S. Appl. No. 13/335,538, entitled "Methods of Refining Natural Oils, and Methods of Producing Fuel Compositions" filed Dec. 22, 2011.
U.S. Appl. No. 13/335,584, entitled "Methods of Refining Natural Oils, and Methods of Producing Fuel Compositions" filed Dec. 22, 2011.
Boelhouwer et al., "Metathesis of Fatty Acid Esters," JAOCS, vol. 61(2), Feb. 1984, pp. 425-429.
Mol, "Metathesis of unsaturated fatty acid esters and fatty oils," Journal of Molecualr Catalysis, vol. 90, 1994, pp. 185-199.
Mol, "Catalytic Metathesis of Unsaturated Fatty Acid Esters and Oils," Topics in Catalysis, vol. 27, No. 1-4, 2004, pp. 97-104.
Othmer, Kirk, "Metathesis," Encyclopedia of Chemical Technology, vol. 26, Dec. 2005, pp. 920-958.
Patel, Jim et al., "Cross-metathesis of unsaturated natural oils with 2-butene, High conversion and productive catalyst turnovers," Chem. Commun., 2005, pp. 5546-5547.
Sakamuri, Raj, "Ester," Kirk-Othmer Encyclopedia of Chemical Technology, John Wiley & Sons, 2001, available online Dec. 19, 2003, 31 pages.
Seador, J.D. et al., "Distillation," Perry's Chemical Engineer's Handbook, R.H. Perry and D.W. Green, eds., McGraw-Hill, 7th Ed., 1997, available online Mar. 1, 2001, 7 pages.
Ackman, R.G. et al., "Ozonolysis of Unsaturated Fatty Acids," *Can. J. Chem.*, vol. 39, 1961, pp. 1956-1963.
Bryan, Tom, "Adsorbing It All," *Biodiesel Magazine*, Mar. 2005, pp. 40-43.
Foglia, T.A., et al., "Oxidation of Unsaturated Fatty Acids With Ruthenium and Osmium Tetroxide," *J. Am. Oil Chemists' Soc.*, vol. 54, Nov. 1977, pp. 870A-872A.

(56) References Cited

OTHER PUBLICATIONS

Kram, Jerry W., "Cleaner and Clearer," *Biodiesel Magazine*, Jan. 2008, 4 pages.

Noureddini, H. et al., "Liquid-Phase Catalytic Oxidation of Unsaturated Fatty Acids," *Journal of American Oil Chemists' Society*, vol. 76, No. 3, 1999, pp. 305-312.

Oakley, Michael A., et al., "Practical Dihydroxylation and C-C Cleavage of Unsaturated Fatty Acids," *Journal of Molecular Catalysis A: Chemical*, vol. 150, 1999, pp. 105-111.

Patel, Jim et al., "High Conversion and Productive Catalyst Turnovers in Cross-Metathesis Reactions of Natural Oils With 2-Butene," *Green Chem.*, vol. 8, 2006, pp. 450-454.

Rüsch gen. Klaas, M., et al., "Transition-Metal Catalyzed Oxidative Cleavage of Unsaturated Fatty Acids," *Fat Sci. Technol.*, vol. 95(10), 1995, pp. 359-367.

Santacesaria, E., et al., "Oxidative Cleavage of the Double Bond of Monoenic Fatty Chains in Two Steps: A New Promising Route to Azelaic Acid and Other Industrial Products," *Ind. Eng. Chem. Res.*, vol. 39, 2000, pp. 2766-2771.

Santacesaria, E. et al., "Double Bond Oxidative Cleavage of Monoenic Fatty Chains," *Catalysis Today*, vol. 79-80, 2003, pp. 59-65.

Throckmorton, P.E. et al., "Pilot Run, Plant Design and Cost Analysis for Reductive Ozonolysis of Methyl Soyate," *Research and Development Laboratories*, 1967, p. 643.

Throckmorton, P.E. et al., "Reductive Ozonolysis of Soybean Oil: Laboratory Optimization of Process Variables," *Research and Development Laboratories*, p. 641. 1972.

Turnwald, S.E., et al., "Oleic Acid Oxidation Using Hydrogen Peroxide in Conjunction With Transition Metal Catalysis," *Journal of Materials Science Letters*, vol. 17, 1998, pp. 1305-1307.

International Search Report and Written Opinion of the International Searching Authority for International Application No. PCT/US2010/052174, dated Apr. 15, 2011, 9 pages.

\* cited by examiner

METHODS OF REFINING NATURAL OILS, AND METHODS OF PRODUCING FUEL COMPOSITIONS

RELATED APPLICATIONS

This is a continuation-in-part of prior application Ser. No. 12/901,829, filed Oct. 11, 2010 now U.S. Pat. No. 8,957,268, which claims the benefit of U.S. Provisional Application No. 61/250,743, filed Oct. 12, 2009. The entire contents of both of these documents are incorporated herein by reference, except that in the event of any inconsistent disclosure or definition from the present specification, the disclosure or definition herein shall be deemed to prevail.

TECHNICAL FIELD

The present teachings relate generally to methods for suppressing the isomerization of olefins—particularly olefins produced in metathesis reactions.

BACKGROUND

In recent years, there has been an increased demand for petroleum-based transportation fuels. Concerns exist that the world's petroleum production may not be able to keep up with demand. Additionally, the increased demand for petroleum-based fuels has resulted in a higher production of greenhouse gases. Due to the increased demand for fuel and increased production of greenhouse gases, there is a need to explore methods of producing environmentally-friendly, alternative fuel sources. In particular, there is a need to explore methods of producing environmentally friendly fuel compositions and specialty chemicals from a natural feedstock.

Researchers have been studying the feasibility of manufacturing biofuels, waxes, plastics, and the like, using natural oil feedstocks, such as vegetable and seed-based oils. Metathesis reactions involving natural oil feedstocks offer promising solutions for today and for the future.

The olefin metathesis reaction is a highly versatile and powerful technique for the synthetic preparation of alkenes. Transition metal carbene complexes—particularly those incorporating ruthenium—are popular catalysts for metathesis. However, the yield of certain desired metathesis products can be significantly reduced by double bond isomerization. This is typically the result of residual metathesis catalyst and/or its byproducts being present in the reaction mixture. This problem becomes particularly acute if the metathesis mixture is heated and/or distilled in the presence of residual catalyst.

In view of this problem, it is oftentimes necessary to remove residual metathesis catalyst from an olefinic metathesis product (or otherwise passivate the residual catalyst) prior to subjecting the olefinic metathesis product to further chemical reactions and/or processing. One approach, as described in U.S. Pat. No. 6,215,019 B1, has been to add tris(hydroxymethyl)phosphine (THMP) to the reaction mixture as an isomerization inhibitor. Unfortunately, the commercial availability and pricing of THMP are not viable on an industrial scale. Moreover, although THMP can be prepared from precursor salts, such as tetrakis(hydroxymethyl)phosphonium sulfate (THPS) or tetrakis(hydroxymethyl)phosphonium chloride (TKC), the conversion involves generation of formaldehyde—a known human carcinogen—as a byproduct. In addition, if pH is not strictly controlled during the formation of THMP (e.g., if conditions become too basic), explosive hydrogen gas has been known to form.

An isomerization suppression agent that efficiently passivates residual metathesis catalyst present in admixture with olefinic metathesis product, and which is readily available on a commercial scale but does not produce carcinogenic by-products and/or involve the formation of explosive hydrogen gas is needed.

SUMMARY

The scope of the present invention is defined solely by the appended claims, and is not affected to any degree by the statements within this summary.

By way of introduction, a method of refining a natural oil includes: (a) providing a feedstock that includes a natural oil; (b) reacting the feedstock in the presence of a metathesis catalyst to form a metathesized product that includes olefins and esters; (c) passivating residual metathesis catalyst with an agent selected from the group consisting of (i) a salt and/or an ester of a phosphorous oxo acid, (ii) a derivative of the phosphorous oxo acid in which at least one P—H bond has been replaced by a P—C bond, (iii) a salt and/or an ester of the derivative, and (iv) combinations thereof; (d) separating the olefins in the metathesized product from the esters in the metathesized product; and (e) transesterifying the esters in the presence of an alcohol to form a transesterified product and/or hydrogenating the olefins to form a fully or partially saturated hydrogenated product.

A first method of producing a fuel composition includes: (a) providing a feedstock comprising a natural oil; (b) reacting the feedstock in the presence of a metathesis catalyst to form a metathesized product that includes olefins and esters; (c) passivating residual metathesis catalyst with an agent selected from the group consisting of (i) a salt and/or an ester of a phosphorous oxo acid, (ii) a derivative of the phosphorous oxo acid in which at least one P—H bond has been replaced by a P—C bond, (iii) a salt and/or an ester of the derivative, and (iv) combinations thereof; (d) separating the olefins in the metathesized product from the esters in the metathesized product; and (e) hydrogenating the olefins to form a fuel composition.

A second method of producing a fuel composition includes: (a) providing a feedstock comprising a natural oil; (b) reacting the feedstock in the presence of a metathesis catalyst under conditions sufficient to form a metathesized product that includes olefins and esters; (c) passivating residual metathesis catalyst with an agent selected from the group consisting of (i) a salt and/or an ester of a phosphorous oxo acid, (ii) a derivative of the phosphorous oxo acid in which at least one P—H bond has been replaced by a P—C bond, (iii) a salt and/or an ester of the derivative, and (iv) combinations thereof; (d) hydrogenating the metathesized product to form a fuel composition and at least partially saturated esters; and (e) separating the fuel composition from the at least partially saturated esters.

DETAILED DESCRIPTION

Figure 1:
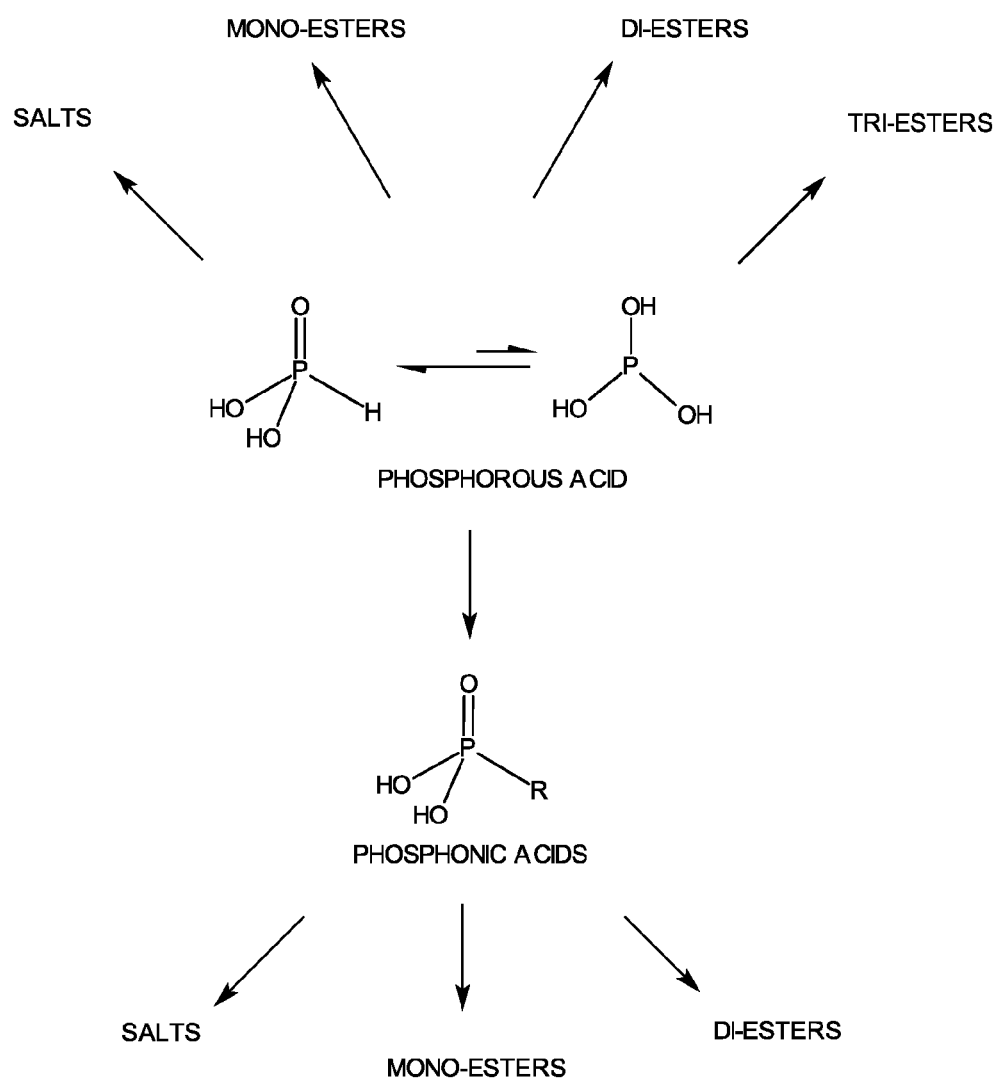
FIG. 1 shows representative phosphorous acid derivatives for use in accordance with the present teachings.

An effective methodology for suppressing the isomerization of olefin metathesis products—which is suitable for application on a large-scale, does not involve the generation of carcinogenic byproducts, such as formaldehyde, and is not susceptible to the generation of explosive gas, such as hydrogen—has been discovered and is described herein. In some embodiments, the inventive methodology utilizes (i) a salt and/or an ester of a phosphorous oxo acid, and/or (ii) a derivative of the phosphorous oxo acid in which at least one P—H bond has been replaced by a P—C bond, and/or (iii) a salt and/or an ester of the derivative. In some embodiments, the inventive methodology facilitates preservation of the original location of a carbon-carbon double bond created during a metathesis reaction, thereby facilitating subsequent processing of metathesized product and preserving product integrity.

In some embodiments of the inventive methodology, the mixture comprising the olefin metathesis product can be subjected to further processing—which, in some embodiments, optionally involves heating (e.g., distillation, transesterification, and/or the like)—in order to separate off and/or derivatize an olefin metathesis product. In some embodiments, surprisingly and unexpectedly, the mixture can be subjected to such processing directly and without first requiring removal of the isomerization suppression agent (e.g., via water extraction or the like). In some embodiments, surprisingly and unexpectedly, processing without first removing the isomerization suppression agent—even when heating is involved—does not substantially compromise the integrity of the olefin metathesis product and/or its derivatives. In some embodiments, a metathesized oil treated with an isomerization suppression agent in accordance with the present teachings can be separated (e.g., via distillation) into a triacylglyceride fraction (which, in some embodiments, can optionally be transesterified) and an olefinic fraction without first requiring the removal of the added isomerization suppression agent.

DEFINITIONS

Throughout this description and in the appended claims, the following definitions are to be understood:

The term "olefin" refers to a hydrocarbon compound containing at least one carbon-carbon double bond. As used herein, the term "olefin" encompasses hydrocarbons having more than one carbon-carbon double bond (e.g., di-olefins, tri-olefins, etc.). In some embodiments, the term "olefin" refers to a group of carbon-carbon double bond-containing compounds with different chain lengths. In some embodiments, the term "olefin" refers to poly-olefins, straight, branched, and/or cyclic olefins.

The term "suppressing" as used in reference to the isomerization of an olefin refers to an inhibitory effect on an olefin's susceptibility towards isomerization under a given set of conditions. It is to be understood that the term "suppressing" encompasses but does not necessarily imply 100% suppression (i.e., 0% isomerization).

The term "isomerization" as used in reference to an olefin metathesis product refers to the migration of a carbon-carbon double bond in the product to another location within the molecule (e.g., from a terminal position to an internal position and/or from an internal position to a terminal position and/or from a first internal position to a second internal position and/or from a first terminal position to a second terminal position, etc.).

The phrase "olefin metathesis product" refers to any product produced in a metathesis reaction that contains at least one carbon-carbon double bond. In some embodiments, the "olefin metathesis product" is an unfunctionalized hydrocarbon compound. In some embodiments, the phrase "olefin metathesis product" subsumes the term "olefin." In some embodiments, the "olefin metathesis product" is functionalized and contains one or a plurality of additional functional groups in addition to its at least one carbon-carbon double bond.

The term "functionalized" and the phrase "functional group" refer to the presence in a molecule of one or more heteroatoms at a terminal and/or an internal position, wherein the one or more heteroatoms is an atom other than carbon and hydrogen. In some embodiments, the heteroatom constitutes one atom of a polyatomic functional group with representative functional groups including but not limited to carboxylic acids, carboxylic esters, ketones, aldehydes, anhydrides, ether groups, cyano groups, nitro groups, sulfur-containing groups, phosphorous-containing groups, amides, imides, N-containing heterocycles, aromatic N-containing heterocycles, salts thereof, and the like, and combinations thereof.

The phrase "metathesis reaction" refers to a chemical reaction involving a single type of olefin or a plurality of different types of olefin, which is conducted in the presence of a metathesis catalyst, and which results in the formation of at least one new olefin product. The phrase "metathesis reaction" encompasses self-metathesis, cross-metathesis (aka co-metathesis; CM), ring-opening metathesis (ROM), ring-opening metathesis polymerizations (ROMP), ring-closing metathesis (RCM), acyclic diene metathesis (ADMET), and the like, and combinations thereof. In some embodiments, the phrase "metathesis reaction" refers to a chemical reaction involving a natural oil feedstock.

The phrase "phosphorous oxo acid" refers to a molecule that comprises a P—OH moiety in which the hydrogen atom is ionizable.

The phrase "higher acid" as used in reference to a phosphorous oxo acid refers to an acid in which phosphorous is in an oxidation state of +5.

The phrase "lower acid" as used in reference to a phosphorous oxo acid refers to an acid in which phosphorous is in an oxidation state below +5 (e.g., $P^{III}$).

The phrase "ester of a phosphorous oxo acid" refers to a molecule that comprises a P—OR bond, wherein R denotes any substituted or unsubstituted alkyl or aryl group.

The phrase "substantially water-insoluble" as used in reference to an ester of a phosphorous oxo acid refers to a molecule that partitions into an organic phase in preference to an aqueous phase. It is to be understood that the phrase "substantially water-insoluble" encompasses but does not necessarily imply 0% aqueous solubility.

The phrases "natural oil," "natural oil feedstock," and the like refer to oils derived from plant or animal sources. As used herein, these phrases encompass natural oil derivatives as well, unless otherwise indicated.

The term "derivative" as used in reference to a substrate (e.g., a "functionalized derivative" of a carboxylic acid, such as 9-decenoic acid, etc.) refers to compounds and/or mixture of compounds derived from the substrate by any one or combination of methods known in the art, including but not limited to saponification, transesterification, esterification, amidification, amination, imide preparation, hydrogenation (partial or full), isomerization, oxidation, reduction, and the like, and combinations thereof.

The phrase "natural oil derivatives" refers to compounds and/or mixture of compounds derived from a natural oil using any one or combination of methods known in the art, including but not limited to saponification, transesterification, esterification, amidification, amination, hydrogenation (partial or full), isomerization, oxidation, reduction, and the like, and combinations thereof.

The phrase "low-molecular-weight olefin" refers to any straight, branched or cyclic olefin in the $C_2$ to $C_{30}$ range and/or any combination of such olefins. The phrase "low-molecular-weight olefin" encompasses polyolefins including but not limited to dienes, trienes, and the like. In some embodiments, the low-molecular-weight olefin is functionalized.

The term "ester" as used in reference to olefin metathesis products and/or derivatives thereof refers to compounds having a general formula R—COO—R', wherein R and R' denote any substituted or unsubstituted alkyl or aryl group. In some embodiments, the term "ester" refers to a group of compounds having a general formula as described above, wherein the compounds have different chain lengths.

The phrase "residual metathesis catalyst" refers to a catalytic material left over from a metathesis reaction that is capable of participating in, catalyzing and/or otherwise promoting or facilitating the isomerization of a carbon-carbon double bond although it may or may not still be capable of catalyzing a metathesis reaction. As used herein, the phrase "residual metathesis catalyst" encompasses wholly unreacted metathesis catalyst, partially reacted metathesis catalyst, and all manner of chemical entities derived from a metathesis catalyst over the course of a metathesis reaction, including but not limited to all manner of active or inactive intermediates (e.g., carbenes, metallocycles, etc.), degradation and/or decomposition products (e.g., metal hydrides, ligand fragments, etc.), metals, metal salts, metal complexes, and the like, and combinations thereof.

The term "passivate" as used in reference to residual metathesis catalyst refers to any reduction in the activity of the residual metathesis catalyst vis-à-vis its ability and/or tendency to catalyze and/or otherwise participate in (e.g., via a stoichiometric chemical reaction, sequestration or the like) the isomerization of a carbon-carbon double bond. It is to be understood that the term "passivate" encompasses but does not necessarily imply complete deactivation of residual metathesis catalyst towards isomerization of a carbon-carbon double bond.

The phrase "conditions sufficient to passivate" as used in reference to the conditions under which an isomerization suppression agent is added to a mixture comprising olefin metathesis product and residual metathesis catalyst refers to a variable combination of experimental parameters, which together result in the passivation of at least a portion of residual metathesis catalyst. The selection of these individual parameters lies well within the skill of the ordinary artisan in view of the guiding principles outlined herein, and will vary according to the target reduction in degree of isomerization that is being sought for a particular application. As used herein, the phrase "conditions sufficient to passivate" encompasses experimental parameters including but not limited to concentrations of reagents, the type of mixing and/or stirring provided (e.g., high-shear, low-intensity, etc.), reaction temperature, residence time, reaction pressure, reaction atmosphere (e.g., exposure to atmosphere vs. an inert gas, etc.), and the like, and combinations thereof.

The phrase "degree of isomerization" as used in relation to an olefin metathesis product refers to an amount to which a carbon-carbon double bond in the olefin metathesis product undergoes migration from its original position to a subsequent position (e.g., the degree to which an initially formed olefin metathesis product is converted into one or more non-identical isomers thereof). In some embodiments, the "degree of isomerization" refers to the degree to which an initially formed α-olefin metathesis product is converted into one or more internal isomers thereof under a given set of conditions (e.g., the amount of terminal-to-internal migration). In some embodiments, the "degree of isomerization" refers to the degree to which an olefin metathesis product containing an internal carbon-carbon double bond is converted into an α-olefin under a given set of conditions (e.g., the amount of internal-to-terminal migration). In some embodiments, the "degree of isomerization" refers to the degree to which an olefin metathesis product containing an internal carbon-carbon double bond is converted into one or more additional and non-identical internal isomers thereof under a given set of conditions (e.g., the amount of internal-to-internal migration). In some embodiments, the "degree of isomerization" refers to the degree to which an initially formed α-olefin metathesis product is converted into a different α-olefin under a given set of conditions (e.g., the amount of terminal-to-terminal migration). In some embodiments, the "degree of isomerization" refers to any combination of the amount of terminal-to-internal migration, the amount of internal-to-terminal migration, the amount of internal-to-internal migration, and/or the amount of terminal-to-terminal migration.

The term "attached" as used in reference to a solid support and an isomerization suppression agent is to be understood broadly and without limitation to encompass a range of associative-type forces, including but not limited to covalent bonds, ionic bonds, physical and/or electrostatic attractive forces (e.g., hydrogen bonds, Van der Waals forces, etc.), and the like, and combinations thereof.

The term "paraffin" refers to hydrocarbon compounds having only single carbon-carbon bonds and having a general formula $C_nH_{2n+2}$. In some embodiments, n is greater than 20.

The term "isomerizing" as used in reference to a "fuel composition" refers to the reaction and conversion of straight-chain hydrocarbon compounds, such as normal paraffins, into branched hydrocarbon compounds, such as iso-paraffins. As a representative and non-limiting example, n-pentane may be isomerized into a mixture of n-pentane, 2-methylbutane, and 2,2-dimethylpropane. Isomerization of normal paraffins may be used to improve the overall properties of a fuel composition. Additionally, isomerization may refer to the conversion of branched paraffins into further, more highly branched paraffins.

The term "yield" refers to the total weight of fuel produced from the metathesis and hydrogenation reactions. It may also refer to the total weight of the fuel following a separation step and/or isomerization reaction. It may be defined in terms of a yield %, wherein the total weight of the fuel produced is divided by the total weight of the natural oil feedstock and, in some embodiments, low-molecular-weight olefin, combined.

The term "fuel" and the phrase "fuel composition" refer to materials meeting certain specifications or a blend of components that are useful in formulating fuel compositions but, by themselves, do not meet all of the required specifications for a fuel.

The phrases "jet fuel" and "aviation fuel" refer to kerosene or naphtha-type fuel cuts, and/or military-grade jet fuel compositions. "Kerosene-type" jet fuel (including Jet A and Jet A-1) has a carbon number distribution between about 8 and about 16. Jet A and Jet A-1 typically have a flash point of at least approximately 38° C., an auto ignition temperature of approximately 210° C., a freeze point less than or equal to approximately −40° C. for Jet A and −47° C. for Jet A-1, a density of approximately 0.8 g/cc at 15° C., and an energy density of approximately 42.8-43.2 MJ/kg. "Naphtha-type" or "wide-cut" jet fuel (including Jet B) has a carbon number distribution between about 5 and about 15. Jet B typically comprises a flash point below approximately 0° C., an auto ignition temperature of approximately 250° C., a freeze point of approximately −51° C., a density of approximately 0.78 g/cc, and an energy density of approximately 42.8-43.5 MJ/kg. "Military grade" jet fuel refers to the Jet Propulsion or "JP" numbering system (JP-1, JP-2, JP-3, JP-4, JP-5, JP-6, JP-7, JP-8, etc.). Military grade jet fuels may comprise alternative or additional additives to have higher flash points than Jet A, Jet A-1, or Jet B in order to cope with heat and stress endured during supersonic flight.

The term "diesel fuel" refers to a hydrocarbon composition having a carbon number distribution between about 8 and about 25. Diesel fuels typically have a specific gravity of approximately 0.82-1.08 at 15.6° C. (60° F.) based on water having a specific gravity of 1 at 60° F. Diesel fuels typically comprise a distillation range between approximately 180-340° C. (356-644° F.). Additionally, diesel fuels have a minimum cetane index number of approximately 40.

As used herein, the term "carbon number distribution" refers to the range of compounds present in a composition, wherein each compound is defined by the number of carbon atoms present. As a non-limiting example, a naphtha-type jet fuel typically comprises a distribution of hydrocarbon compounds wherein a majority of those compounds have between 5 and 15 carbon atoms each. A kerosene-type jet fuel typically comprises a distribution of hydrocarbon compounds wherein a majority of those compounds have between 8 and 16 carbon atoms each. A diesel fuel typically comprises a distribution of hydrocarbon compounds wherein a majority of those compounds have between 8 and 25 carbon atoms each.

As used herein, the term "energy density" refers to the amount of energy stored in a given system per unit mass (MJ/kg) or per unit volume (MJ/L), where MJ refer to million Joules. As a non-limiting example, the energy density of kerosene- or naphtha-type jet fuel is typically greater than about 40 MJ/kg.

By way of general background, as mentioned above, the presence of residual metathesis catalyst during heating and/or distillation of an olefin metathesis product can result in the isomerization of a carbon-carbon double bond in the product, such that one or more isomers of the original olefin metathesis product are formed. Such isomerization is generally undesirable when end-group functionalization within the product molecule is the goal. In addition, such isomerization is generally undesirable when it leads to a mixture of products and the goal is a well-defined product in high yield and in high purity. Labile olefins and/or olefins that are not as thermodynamically stable as other isomers readily accessible through isomerization are particularly—though by no means exclusively—susceptible to isomerization (e.g., terminal olefins, vinyl olefins, vinylidene olefins, and the like).

By way of example, although methyl 9-decenoate is an expected product of the cross-metathesis between methyl oleate and the α-olefin 1-butene, it is found in practice that some isomerization of the 9-substituted olefin to one or more internal olefins (e.g., migration of the double bond to the 7- and/or 8-positions) can occur when the cross metathesis product is heated prior to removal and/or pacification of residual metathesis catalyst. To assess the magnitude of the isomerization, the cross-metathesized material obtained from the cross-metathesis between methyl oleate and 1-butene was subjected to typical oil refining conditions, such as exposure to high temperatures (e.g., about 250° C.). In the absence of any isomerization suppression agent, the degree of isomerization of methyl 9-decenoate to internal isomers under typical conditions was observed to be about 25%. It is to be understood, however, that this degree of isomerization is meant solely to be illustrative and that it can vary depending on the particular substrate and conditions.

However, by adding, for example, an ester of a phosphorous oxo acid as an isomerization suppression agent—particularly though not exclusively a phosphite ester (which, in some embodiments, has a molecular weight sufficiently high that the phosphite ester exhibits thermal stability), and particularly though not exclusively in an excess molar amounts relative to residual metathesis catalyst—the present inventors found that the degree of isomerization can be greatly reduced. Moreover, many esters of phosphorous oxo acids (e.g., various high molecular weight phosphite esters that are used as secondary antioxidants during high temperature polymer processes, including but not limited to the extrusion of polyolefins at temperatures above about 250° C.) are available in commercial quantities and are not subject to the same carcinogenicity and explosion concerns that are associated with THMP production.

It is to be understood that elements and features of the various representative embodiments described below may be combined in different ways to produce new embodiments that likewise fall within the scope of the present teachings.

By way of general introduction, in some embodiments, a method in accordance with the present teachings for suppressing isomerization of an olefin metathesis product produced in a metathesis reaction comprises adding an isomerization suppression agent to a mixture that comprises the olefin metathesis product and residual metathesis catalyst from the metathesis reaction. The isomerization suppression agent is added under conditions sufficient to passivate at least a portion of the residual metathesis catalyst, and is selected from the group consisting of (i) a salt and/or an ester of a phosphorous oxo acid, (ii) a derivative of the phosphorous oxo acid in which at least one P—H bond has been replaced by a P—C bond, (iii) a salt and/or an ester of the derivative, and (iv) combinations thereof. In some embodiments, the ester of the phosphorous oxo acid is substantially water-insoluble.

As described above, in some embodiments—particularly though not exclusively embodiments in which the isomerization suppression agent comprises a phosphite ester having a sufficiently high molecular weight and exhibiting a desired degree of thermal stability—the mixture comprising the olefin metathesis product can be subjected directly to further processing in the presence of the isomerization suppression agent. In other words, in some embodiments, it may not be possible, necessary, and/or desirable to remove the isomerization suppression agent via extraction with a polar solvent (e.g., water) prior to further processing, including but not limited to processing that involves heating. In some embodiments, one such isomerization suppression agent comprises a substantially water-insoluble ester of a phosphorous oxo acid which, in some embodiments, may not partition to a significant degree in a polar solvent.

It is to be understood that under a give set of biphasic conditions, a "substantially water-insoluble" ester of a phosphorous oxo acid may partition to some extent into the aqueous phase rather than the organic phase (albeit in an amount that is less than about 50 wt %, in some embodiments less than about 40 wt %, in some embodiments less than about 35 wt %, in some embodiments less than about 30 wt %, in some embodiments less than about 25 wt %, in some embodiments less than about 20 wt %, in some embodiments less than about 15 wt %, in some embodiments less than about 10 wt %, in some embodiments less than about 5 wt %, in some embodiments less than about 3 wt %, and in some embodiments less than about 1 wt %). The use of such a substantially water-insoluble ester of a phosphorous oxo acid in accordance with the present teachings stands in stark contrast to conventional wisdom which advocates removal of metathesis catalyst with a water-soluble phosphine, such as THMP (e.g., International Patent Application Publication No. WO 01/36368 A2).

Thus, as described above, after the isomerization suppression agent has been added to the mixture comprising the olefin metathesis product and residual metathesis catalyst, the isomerization suppression agent, in some embodiments, can be left in the mixture and carried along, either in whole or in part, in a subsequent chemical reaction or processing step. In other embodiments, including but not limited to embodiments in which the isomerization suppression agent comprises (i) an at least partially water-soluble salt and/or ester of a phosphorous oxo acid, and/or (ii) an at least partially water-soluble derivative of the phosphorous oxo acid in which at least one P—H bond has been replaced by a P—C bond, and/or (iii) an at least partially water-soluble salt and/or ester of the derivative, the isomerization suppression agent can optionally be separated and removed from the mixture, either partially or completely, prior to any subsequent reaction or processing step.

For embodiments in which it is desirable to separate and/or remove isomerization suppression agent following passivation of residual metathesis catalyst, a method in accordance with the present teachings can optionally further comprise washing or extracting the metathesis reaction mixture with a polar solvent (e.g., particularly, though not exclusively, for embodiments in which the isomerization suppression agent is at least partially soluble in the polar solvent). In some embodiments, the polar solvent is at least partially non-miscible with the mixture, such that a separation of layers can occur. In some embodiments, at least a portion of the isomerization suppression agent is partitioned into the polar solvent layer, which can then be separated from the non-miscible remaining layer and removed. Representative polar solvents for use in accordance with the present teachings include but are not limited to water, alcohols (e.g., methanol, ethanol, etc.), ethylene glycol, glycerol, DMF, multifunctional polar compounds including but not limited to polyethylene glycols and/or glymes, and the like, and combinations thereof. In some embodiments, the mixture is extracted with water. In some embodiments, when the ester of the phosphorous oxo acid used as an isomerization suppression agent is a phosphite ester that is at least partially hydrolyzable (e.g., in some embodiments, a phosphite ester having a low molecular weight, including but not limited to trimethyl phosphite, triethyl phosphite, and a combination thereof), washing the mixture with water may convert the phosphite ester into a corresponding acid. While neither desiring to be bound by any particular theory nor intending to limit in any measure the scope of the appended claims or their equivalents, it is presently believed that such a hydrolysis may occur more rapidly with lower molecular weight esters.

In addition to or as an alternative to washing the mixture with a polar solvent to remove isomerization suppression agent—which, in some embodiments, may serve to remove at least a portion of the isomerization suppression agent—a method in accordance with the present teachings can optionally further comprise removing at least a portion of the isomerization suppression agent by adsorbing it onto an adsorbent, which optionally can then be physically separated from the mixture (e.g., via filtration or the like). In some embodiments, the adsorbent is polar. Representative adsorbents for use in accordance with the present teachings include but are not limited to carbon, silica, silica-alumina, alumina, clay, magnesium silicates (e.g., Magnesols), the synthetic silica adsorbent sold under the tradename TRISYL by W. R. Grace & Co., diatomaceous earth, and the like, and combinations thereof.

In some embodiments, the olefin metathesis product comprises at least one terminal double bond and, in some embodiments, the isomerization comprises conversion of the terminal double bond to an internal double bond. In some embodiments, the olefin metathesis product comprises at least one internal double bond and, in some embodiments, the isomerization comprises conversion of the internal double bond to a different internal double bond (i.e., an internal double bond between two carbon atoms at least one of which was not part of the original internal double bond). In some embodiments, the olefin metathesis product comprises at least one internal double bond and, in some embodiments, the isomerization comprises conversion of the internal double bond to a terminal double bond. In some embodiments, the suppressing of the isomerization comprises an observed degree of isomerization that is less than about 5%, in some embodiments less than about 4%, in some embodiments less than about 3%, in some embodiments less than about 2%, in some embodiments less than about 1%, in some embodiments less than about 0.9%, in some embodiments less than about 0.8%, in some embodiments less than about 0.7%, in some embodiments less than about 0.6%, in some embodiments less than about 0.5%, in some embodiments less than about 0.4%, in some embodiments less than about 0.3%, in some embodiments less than about 0.2%, and in some embodiments less than about 0.1%.

In some embodiments, the olefin metathesis product is α,ω-di-functionalized. In some embodiments, the olefin metathesis product comprises a carboxylic acid moiety. In some embodiments, the olefin metathesis product comprises a terminal olefin and a carboxylic acid moiety. In some embodiments, the olefin metathesis product comprises an internal olefin and a carboxylic acid moiety. In some embodiments, the olefin metathesis product comprises a carboxylic ester moiety. In some embodiments, the olefin metathesis product comprises a terminal olefin and a carboxylic ester moiety. In some embodiments, the olefin metathesis product comprises an internal olefin and a carboxylic ester moiety. In some embodiments, the olefin metathesis product is selected from the group consisting of 9-decenoic acid, an ester of 9-decenoic acid, 9-undecenoic acid, an ester of 9-undecenoic acid, 9-dodecenoic acid, an ester of 9-dodecenoic acid, 1-decene, 2-dodecene, 3-dodecene, and combinations thereof. In some embodiments, the esters of 9-decenoic acid, 9-undecenoic acid, and 9-dodecenoic acid are alkyl esters, and, in some embodiments, methyl esters (e.g., methyl 9-decenoate, methyl 9-undecenoate, methyl 9-dodecenoate, etc.).

In some embodiments, the olefin metathesis product is derived from a natural oil reactant. In some embodiments, the metathesis reaction that produced the olefin metathesis product comprises self-metathesis of a natural oil and/or a derivative thereof. In some embodiments, the metathesis reaction that produced the olefin metathesis product comprises cross-metathesis between a natural oil and/or a derivative thereof and a low molecular weight olefin.

Representative examples of natural oils for use in accordance with the present teachings include but are not limited to vegetable oils, algal oils, animal fats, tall oils (e.g., by-products of wood pulp manufacture), derivatives of these oils, and the like, and combinations thereof. Representative examples of vegetable oils for use in accordance with the present teachings include but are not limited to canola oil, rapeseed oil, coconut oil, corn oil, cottonseed oil, olive oil, palm oil, peanut oil, safflower oil, sesame oil, soybean oil, sunflower oil, linseed oil, palm kernel oil, tung oil, jatropha oil, mustard oil, pennycress oil, camelina oil, hemp oil, castor oil, and the like, and combinations thereof. Representative examples of animal fats for use in accordance with the present teachings include but are not limited to lard, tallow, poultry fat, yellow grease, brown grease, fish oil, and the like, and combinations thereof. In some embodiments, the natural oil may be refined, bleached, and/or deodorized.

Representative examples of natural oil derivatives for use in accordance with the present teachings include but are not limited to gums, phospholipids, soapstock, acidulated soapstock, distillate or distillate sludge, fatty acids, fatty acid alkyl esters (e.g., non-limiting examples such as 2-ethylhexyl ester, etc.), hydroxy-substituted variations thereof, and the like, and combinations thereof. In some embodiments, the natural oil derivative is a fatty acid methyl ester (FAME) derived from the glyceride of the natural oil.

In some embodiments, the low-molecular-weight olefin is an "α-olefin" (aka "terminal olefin") in which the unsaturated carbon-carbon bond is present at one end of the compound. In some embodiments, the low-molecular-weight olefin is an internal olefin. In some embodiments, the low-molecular-weight olefin is functionalized. In some embodiments, the low-molecular weight olefin is a $C_2$-$C_{30}$ olefin. In some embodiments, the low-molecular weight olefin is a $C_2$-$C_{30}$ α-olefin. In some embodiments, the low-molecular weight olefin is a $C_2$-$C_{25}$ olefin. In some embodiments, the low-molecular weight olefin is a $C_2$-$C_{25}$ α-olefin. In some embodiments, the low-molecular weight olefin is a $C_2$-$C_{20}$ olefin. In some embodiments, the low-molecular weight olefin is a $C_2$-$C_{20}$ α-olefin. In some embodiments, the low-molecular weight olefin is a $C_2$-$C_{15}$ olefin. In some embodiments, the low-molecular weight olefin is a $C_2$-$C_{15}$ α-olefin. In some embodiments, the low-molecular weight olefin is a $C_2$-$C_{10}$ olefin. In some embodiments, the low-molecular weight olefin is a $C_2$-$C_{10}$ α-olefin. In some embodiments, the low-molecular weight olefin is a $C_2$-$C_8$ olefin. In some embodiments, the low-molecular weight olefin is a $C_2$-$C_8$ α-olefin. In some embodiments, the low-molecular weight olefin is a $C_2$-$C_6$ olefin. In some embodiments, the low-molecular weight olefin is a $C_2$-$C_6$ α-olefin. Representative low-molecular-weight olefins in the $C_2$ to $C_6$ range include but are not limited to ethylene, propylene, 1-butene, 2-butene, isobutene, 1-pentene, 2-pentene, 3-pentene, 2-methyl-1-butene, 2-methyl-2-butene, 3-methyl-1-butene, cyclopentene, 1-hexene, 2-hexene, 3-hexene, 4-hexene, 2-methyl-1-pentene, 3-methyl-1-pentene, 4-methyl-1-pentene, 2-methyl-2-pentene, 3-methyl-2-pentene, 4-methyl-2-pentene, 2-methyl-3-pentene, 1-hexene, 2-hexene, 3-hexene, cyclohexene, and the like, and combinations thereof. In some embodiments, the low-molecular-weight olefin is an α-olefin selected from the group consisting of styrene, vinyl cyclohexane, and a combination thereof. In some embodiments, the low-molecular weight olefin is a mixture of linear and/or branched olefins in the $C_4$-$C_{10}$ range. In some embodiments, the low molecular weight olefin is a mixture of linear and/or branched $C_4$ olefins (e.g., combinations of 1-butene, 2-butene, and/or iso-butene). In some embodiments, the low-molecular weight olefin is a mixture of linear and/or branched olefins in the higher $C_{11}$-$C_{14}$ range.

In some embodiments, the olefin metathesis product comprises at least one internal double bond, which in some embodiments is cis and in some embodiments is trans. In some embodiments, the olefin metathesis product comprises at least one terminal double bond and at least one internal double bond. In some embodiments, the olefin metathesis product comprises at least one terminal double bond and/or at least one internal double bond, and at least one additional functional group. In some embodiments, the at least one additional functional group is selected from the group consisting of carboxylic acids, carboxylic esters, mono-acylglycerides (MAGs), di-acylglycerides (DAGs), tri-acylglycerides (TAGs), and combinations thereof. In some embodiments, the olefin metathesis product is produced in a self-metathesis reaction. In some embodiments, the olefin metathesis product is produced in a cross-metathesis reaction. In some embodiments, the olefin metathesis product is a downstream derivative of a self-metathesis or cross-metathesis product (including but not limited to, for example, transesterification products, hydrolysis products, and the like, and combinations thereof). In some embodiments, the olefin metathesis product is produced in a metathesis reaction involving one or more previously formed olefin metathesis products (e.g., the production of 9-ODDAME from the cross-metathesis of 9-DAME and 9-DDAME—one or both of which is itself a product of a metathesis reaction).

In some embodiments, the metathesis reaction that produced the olefin metathesis product comprises the reaction of two triglycerides present in a natural feedstock in the presence of a metathesis catalyst (self-metathesis), wherein each triglyceride comprises at least one carbon-carbon double bond, thereby forming a new mixture of olefins and esters that in some embodiments comprises a triglyceride dimer. In some embodiments, the triglyceride dimer comprises more than one carbon-carbon double bond, such that higher oligomers also can form. In some embodiments, the metathesis reaction that produced the olefin metathesis product comprises the reaction of an olefin (e.g., a low-molecular weight olefin) and a triglyceride in a natural feedstock that comprises at least one carbon-carbon double bond, thereby forming new olefinic molecules as well as new ester molecules (cross-metathesis).

In some embodiments, the residual metathesis catalyst comprises a transition metal. In some embodiments, the residual metathesis catalyst comprises ruthenium. In some embodiments, the residual metathesis catalyst comprises rhenium. In some embodiments, the residual metathesis catalyst comprises tantalum. In some embodiments, the residual metathesis catalyst comprises nickel. In some embodiments, the residual metathesis catalyst comprises tungsten. In some embodiments, the residual metathesis catalyst comprises molybdenum.

In some embodiments, the residual metathesis catalyst comprises a ruthenium carbene complex and/or an entity derived from such a complex. In some embodiments, the residual metathesis catalyst comprises a material selected from the group consisting of a ruthenium vinylidene complex, a ruthenium alkylidene complex, a ruthenium methylidene complex, a ruthenium benzylidene complex, and combinations thereof, and/or an entity derived from any such complex or combination of such complexes. In some embodiments, the residual metathesis catalyst comprises a ruthenium carbene complex comprising at least one tricyclohexylphosphine ligand and/or an entity derived from such a complex. In some embodiments, the residual metathesis catalyst comprises a ruthenium carbene complex comprising at least two tricyclohexylphosphine ligands [e.g., $(PCy_3)_2Cl_2Ru=CH-CH=C(CH_3)_2$, etc.] and/or an entity derived from such a complex. In some embodiments, the residual metathesis catalyst comprises a ruthenium carbene complex comprising at least one imidazolidine ligand and/or an entity derived from such a complex. In some embodiments, the residual metathesis catalyst comprises a ruthenium carbene complex comprising an isopropyloxy group attached to a benzene ring and/or an entity derived from such a complex.

In some embodiments, the residual metathesis catalyst comprises a Grubbs-type olefin metathesis catalyst and/or an entity derived therefrom. In some embodiments, the residual metathesis catalyst comprises a first-generation Grubbs-type olefin metathesis catalyst and/or an entity derived therefrom. In some embodiments, the residual metathesis catalyst comprises a second-generation Grubbs-type olefin metathesis catalyst and/or an entity derived therefrom. In some embodiments, the residual metathesis catalyst comprises a first-generation Hoveda-Grubbs-type olefin metathesis catalyst and/or an entity derived therefrom. In some embodiments, the residual metathesis catalyst comprises a second-generation Hoveda-Grubbs-type olefin metathesis catalyst and/or an entity derived therefrom. In some embodiments, the residual metathesis catalyst comprises one or a plurality of the ruthenium carbene metathesis catalysts sold by Materia, Inc. of Pasadena, Calif. and/or one or more entities derived from such catalysts. Representative metathesis catalysts from Materia, Inc. for use in accordance with the present teachings include but are not limited to those sold under the following product numbers as well as combinations thereof: product no. C823 (CAS no. 172222-30-9), product no. C848 (CAS no. 246047-72-3), product no. C601 (CAS no. 203714-71-0), product no. C627 (CAS no. 301224-40-8), product no. C571 (CAS no. 927429-61-6), product no. C598 (CAS no. 802912-44-3), product no. C793 (CAS no. 927429-60-5), product no. C801 (CAS no. 194659-03-9), product no. C827 (CAS no. 253688-91-4), product no. C884 (CAS no. 900169-53-1), product no. C833 (CAS no. 1020085-61-3), product no. C859 (CAS no. 832146-68-6), product no. C711 (CAS no. 635679-24-2), product no. C933 (CAS no. 373640-75-6).

Representative phosphorous oxo acids for use in accordance with the present teachings include but are not limited to those described in F. A. Cotton and G. Wilkinson's Advanced Inorganic Chemistry, Fifth Edition, New York: John Wiley & Sons, 1988, pages 382-443. By way of illustration, representative phosphorous oxo acids include but are not limited to phosphorous acid ($H_3PO_3$, aka "phosphonic acid"), phosphinic acid ($H_3PO_2$, aka "hypophosphorous acid), phosphoric acid ($H_3PO_4$, aka "orthophosphoric acid), pyrophosphoric acid ($H_4P_2O_7$), polyphosphoric acids, ultraphosphonic acid ($H_2P_4O_{11}$), di- and polyacids of phosphorous in lower formal oxidation states that comprise P—H and/or P—P bonds, and the like, and salts and anions thereof, and the like, and combinations thereof.

In some embodiments, the phosphorous oxo acid comprises a higher acid. In some embodiments, the higher acid comprises phosphoric acid. In some embodiments, the ester of the phosphoric acid is selected from the group consisting of mono-esters, di-esters, tri-esters, and combinations thereof. In some embodiments, the ester of the phosphoric acid comprises a mono-ester. In some embodiments, the mono-ester of phosphoric acid is not monophenyl phosphoester [P(O)(OPh)(OH)$_2$].

In some embodiments, the phosphorous oxo acid comprises a lower acid. In some embodiments, the lower acid is selected from the group consisting of phosphorous acid, phosphinic acid, and a combination thereof. In some embodiments, the phosphorous oxo acid comprises phosphorous acid. In some embodiments, as shown in FIG. 1, the ester of the phosphorous acid is selected from the group consisting of mono-esters, di-esters, tri-esters, and combinations thereof. In some embodiments, the ester of the phosphorous acid comprises a tri-ester. In some embodiments, the isomerization suppression agent comprises a phosphite ester. In some embodiments, the phosphite ester comprises a structure $P(OR^1R^2R^3)_3$, wherein $R^1$, $R^2$, and $R^3$ are alike or different and are each independently selected from the group consisting of substituted or unsubstituted $C_1$-$C_{100}$ alkyl, substituted or unsubstituted aryl, and combinations thereof, and wherein covalent bonds may optionally exist between two or more of $R^1$, $R^2$, and $R^3$, such that when two or more of $R^1$, $R^2$, and $R^3$ are taken together, a bidentate or tridentate ligand to phosphorous is formed.

In some embodiments, the phosphite ester is selected from the group consisting of aryl organophosphites, alkyl organophosphites, aryl-alkyl mixed organophosphites, and combinations thereof. In some embodiments, the phosphite ester comprises one or a plurality of the high molecular weight phosphites commercially available from Dover Chemical Corporation of Dover, Ohio and/or Galata Chemicals of Southbury, Conn. Representative phosphites from Dover Chemical Corporation for use in accordance with the present teachings include both liquids and solids, and include but are not limited to those sold under the following product names as well as combinations thereof: trisnonylphenyl phosphite (DOVERPHOS® 4), trisnonylphenyl phosphite (+0.75% triisopropanolamine) (DOVERPHOS® 4-HR), trisnonylphenyl phosphite (+1.0% triisopropanolamine) (DOVERPHOS® 4-HR Plus), trisnonylphenyl phosphite containing maximum residual nonylphenol of 0.1% (DOVERPHOS® HIPURE 4), trisnonylphenyl phosphite (+0.75% triisopropanolamine) containing maximum residual nonylphenol of 0.1% (DOVERPHOS® HIPURE 4-HR), diphenyl phosphite (DOVERPHOS® 213), triphenyl phosphite (DOVERPHOS® 10), phenyl diisodecyl phosphite (DOVERPHOS® 7), diphenyl isodecyl phosphite (DOVERPHOS® 8), diphenyl isooctyl phosphite (DOVERPHOS® 9), tetraphenyl dipropyleneglycol diphosphite (DOVERPHOS® 11), poly (dipropyleneglycol) phenyl phosphite (DOVERPHOS® 12), $C_{12}$-$C_{15}$ alkyl bisphenol A phosphite (DOVERPHOS® 613), $C_{10}$ alkyl bisphenol A phosphite (DOVERPHOS® 675), triisodecyl phosphite (DOVERPHOS® 6), tris(tridecyl)phosphite (DOVERPHOS® 49), trilauryl phosphite (DOVERPHOS® 53), tris(dipropylene glycol) phosphite (DOVERPHOS® 72), dioleyl hydrogen phosphite (DOVERPHOS® 253), tris(2,4-di-tert-butylphenyl)phosphite (DOVERPHOS® S-480), distearyl pentaerythritol diphosphite (DOVERPHOS® S-680), distearyl pentaerythritol diphosphite (+triisopropanolamine) (DOVERPHOS® S-682), bis (2,4-dicumylphenyl)pentaerythritol diphosphite (DOVERPHOS® S-9228), and the like, and combinations thereof. Representative phosphites from Galata Chemicals for use in accordance with the present teachings include both liquids and solids, and include but are not limited to those sold under the following product names as well as combinations thereof: tris (nonylphenyl) phosphite, diphenyl phosphite, triphenyl phosphite, phenyl diisodecyl phosphite, diphenyl isodecyl phosphite, dodecyl nonylphenol phosphite blend, triisodecyl phosphite, triisotridecyl phosphite, 2-ethylhexyl diphenyl phosphite, poly (dipropylene glycol) phenyl phosphite, tetraphenyl dipropyleneglycol diphosphite, trilauryl phosphite, phenyl neopentylene glycol phosphite, heptakis (dipropyleneglycol) triphosphite, trilauryl trithio phosphite, diphenyl tridecyl phosphite, tris (dipropyleneglycol) phosphite, poly 4,4' isopropylidenediphenol-C10 alcohol phosphite, 4,4' isopropylidenediphenol-C12-15 alcohol phosphite, and the like, and combinations thereof.

In some embodiments, the derivative of the phosphorous acid in which at least one P—H bond has been replaced by a P—C bond comprises a phosphonic acid. In some embodiments, the ester of the derivative is selected from the group consisting of mono-esters, di-esters, and a combination thereof. In some embodiments, the ester comprises a phosphonate. In some embodiments, the ester comprises one or a plurality of the phosphonates commercially available from Thermphos International BV (Vlissingen, The Netherlands) and sold under the tradename DEQUEST. Representative phosphonates from Thermphos for use in accordance with the present teachings include but are not limited to those sold under the following product names as well as combinations thereof: amino trimethylene phosphonic acid and salts thereof (DEQUEST® 2000, DEQUEST® 2000EG, DEQUEST® 2000LC, DEQUEST® 2006), 1-hydroxyethylidene-1,1-diphosphonic acid and salts thereof (DEQUEST® 2010, DEQUEST® 2010CS, DEQUEST® 2010LA, DEQUEST® 2010LC, DEQUEST® 2014, DEQUEST® 2016, DEQUEST® 2016D, DEQUEST® 2016DG), DEQUEST® 2046, DEQUEST® 2047, DEQUEST® 2047G, diethylenetriamine penta(methylene phosphonic acid) and salts thereof (DEQUEST® 2060S, DEQUEST® 2066, DEQUEST® 2066A, DEQUEST® 2066C2), a proprietary polyamino phosphonic acid (DEQUEST® 2086), bis(hexamethylene triamine penta(methylene phosphonic acid)) and salts thereof (DEQUEST® 2090), diethylene triamine penta(methylene phosphonic acid) and salts thereof (DEQUEST® 4066), DEQUEST® 4266D, DEQUEST® 6004, and the like, and combinations thereof.

Figure 2:
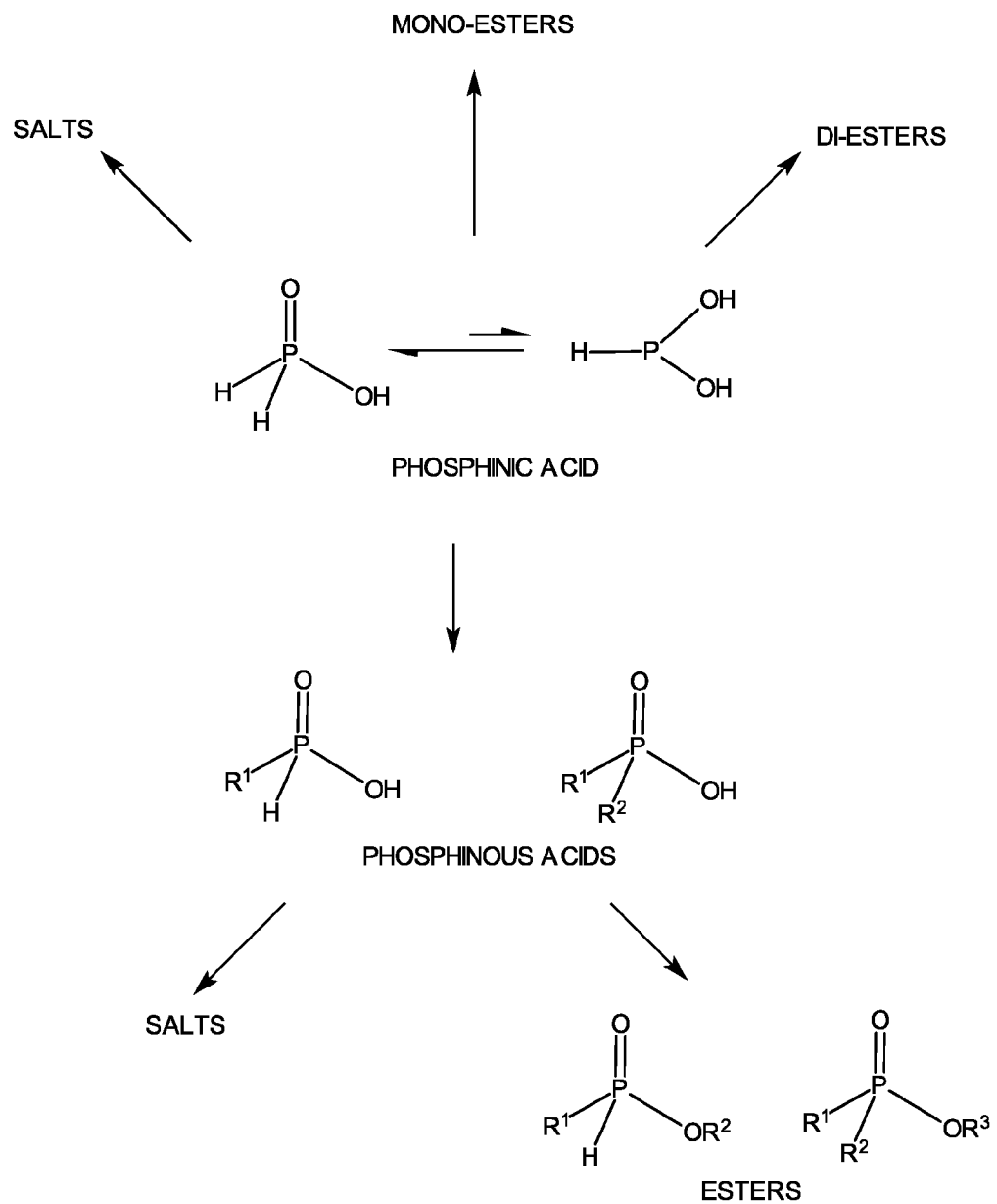
FIG. 2 shows representative phosphinic acid derivatives for use in accordance with the present teachings.

In some embodiments, as shown in FIG. 2, the phosphorous oxo acid comprises phosphinic acid. In some embodiments, the ester of the phosphinic acid is selected from the group consisting of mono-esters, di-esters, and a combination thereof. In some embodiments, the derivative of the phosphinic acid in which at least one P—H bond has been replaced by a P—C bond comprises a phosphinous acid. In some embodiments, the phosphinous acid is selected from the group consisting of $R^1HP(O)OH$, $R^2R^3P(O)OH$, and a combination thereof, wherein $R^1$, $R^2$, and $R^3$ are alike or different and are each independently selected from the group consisting of substituted or unsubstituted $C_1$-$C_{100}$ alkyl, substituted or unsubstituted aryl, and combinations thereof, wherein a covalent bond may exist between $R^2$ and $R^3$, such that when $R^2$ and $R^3$ are taken together, a bidentate ligand to phosphorous is formed. In some embodiments, the ester of the phosphinous acid comprises a structure selected from the group consisting of $R^1HP(O)OR^2$, $R^3R^4P(O)OR^5$, and a combination thereof, wherein $R^1$, $R^2$, $R^3$, $R^4$, and $R^5$ are alike or different and are each independently selected from the group consisting of substituted or unsubstituted $C_1$-$C_{100}$ alkyl, substituted or unsubstituted aryl, and combinations thereof, wherein a covalent bond may exist between $R^1$ and $R^2$, such that when $R^1$ and $R^2$ are taken together, a bidentate ligand to phosphorous is formed, and wherein covalent bonds may optionally exist between two or more of $R^3$, $R^4$, and $R^5$, such that when two or more of $R^3$, $R^4$, and $R^5$ are taken together, a bidentate or tridentate ligand to phosphorous is formed.

In some embodiments, the isomerization suppression agent is attached to a solid support (e.g., silica gel) and comprises (i) a salt and/or an ester of a phosphorous oxo acid, and/or (ii) a derivative of the phosphorous oxo acid in which at least one P—H bond has been replaced by a P—C bond, and/or (iii) a salt and/or an ester of the derivative. In some embodiments, the solid support comprises one or more polar functional groups. Representative solid supports for use in accordance with the present teachings include but are not limited to carbon, silica, silica-alumina, alumina, clay, magnesium silicates (e.g., Magnesols), the synthetic silica adsorbent sold under the tradename TRISYL by W. R. Grace & Co., diatomaceous earth, and the like, and combinations thereof.

In some embodiments, the isomerization suppression agent is added to a mixture in accordance with the present teachings in a molar excess relative to the residual metathesis catalyst. In some embodiments, the molar excess is at least about 2 to 1. In some embodiments, the molar excess is at least about 3 to 1. In some embodiments, the molar excess is at least about 4 to 1. In some embodiments, the molar excess is at least about 5 to 1. In some embodiments, the molar excess is at least about 10 to 1. In some embodiments, the molar excess is at least about 15 to 1. In some embodiments, the molar excess is at least about 20 to 1. In some embodiments, the molar excess is at least about 25 to 1. In some embodiments, the molar excess is at least about 30 to 1. In some embodiments, the molar excess is at least about 35 to 1. In some embodiments, the molar excess is at least about 40 to 1. In some embodiments, the molar excess is at least about 45 to 1. In some embodiments, the molar excess is at least about 50 to 1. In some embodiments, the molar excess is at least about 55 to 1. In some embodiments, the molar excess is at least about 60 to 1. In some embodiments, the molar excess is at least about 65 to 1. In some embodiments, the molar excess is at least about 70 to 1. In some embodiments, the molar excess is at least about 75 to 1. In some embodiments, the molar excess is at least about 80 to 1. In some embodiments, the molar excess is at least about 85 to 1. In some embodiments, the molar excess is at least about 90 to 1. In some embodiments, the molar excess is at least about 95 to 1. In some embodiments, the molar excess is at least about 100 to 1.

While neither desiring to be bound by any particular theory nor intending to limit in any measure the scope of the appended claims or their equivalents, it is presently believed that as the organic solubility of an isomerization suppression agent in accordance with the present teachings increases, the molar excess of isomerization suppression agent to residual metathesis catalyst may decrease without substantially diminishing the efficacy of isomerization suppression. Moreover, while neither desiring to be bound by any particular theory nor intending to limit in any measure the scope of the appended claims or their equivalents, it is presently believed that when high shear mixing is employed, the molar excess of isomerization suppression agent to residual metathesis catalyst may decrease without substantially diminishing the efficacy of isomerization suppression.

In some embodiments, the conditions under which an isomerization suppression agent in accordance with the present teachings is added to a mixture that comprises an olefin metathesis product and residual metathesis catalyst comprise mixing. In some embodiments, the mixing comprises high shear mixing (e.g., mixing of a type sufficient to disperse and/or transport at least a portion of a first phase and/or chemical species into a second phase with which the first phase and/or a chemical species would normally be at least partly immiscible).

In some embodiments, the conditions under which an isomerization suppression agent in accordance with the present teachings is added to a mixture that comprises an olefin metathesis product and residual metathesis catalyst comprise heating. The present teachings are in no way restricted to any particular heating temperature or range of temperatures. However, for purposes of illustration, in some embodiments, the conditions under which an isomerization suppression agent in accordance with the present teachings is added to a mixture that comprises an olefin metathesis product and residual metathesis catalyst comprise a heating temperature of about 40° C. or higher. In some embodiments, the heating comprises a temperature of about 50° C. or higher. In some embodiments, the heating comprises a temperature of about 60° C. or higher. In some embodiments, the heating comprises a temperature of about 70° C. or higher. In some embodiments, the heating comprises a temperature of about 80° C. or higher. In some embodiments, the heating comprises a temperature of about 90° C. or higher.

The present teachings are in no way restricted to any particular duration of residence time. However, for purposes of illustration, in some embodiments, the conditions under which an isomerization suppression agent in accordance with the present teachings is added to a mixture that comprises an olefin metathesis product and residual metathesis catalyst comprise a residence time of at least about 1 minute. In some embodiments, the conditions comprise a residence time of at least about 2 minutes. In some embodiments, the conditions comprise a residence time of at least about 3 minutes. In some embodiments, the conditions comprise a residence time of at least about 4 minutes. In some embodiments, the conditions comprise a residence time of at least about 5 minutes. In some embodiments, the conditions comprise a residence time of at least about 10 minutes. In some embodiments, the conditions comprise a residence time of at least about 15 minutes. In some embodiments, the conditions comprise a residence time of at least about 20 minutes. In some embodiments, the conditions comprise a residence time of at least about 25 minutes. In some embodiments, the conditions comprise a residence time of at least about 30 minutes. In some embodiments, the conditions comprise a residence time of at least about 35 minutes. In some embodiments, the conditions comprise a residence time of at least about 40 minutes. In some embodiments, the conditions comprise a residence time of at least about 45 minutes. In some embodiments, the conditions comprise a residence time of at least about 50 minutes. In some embodiments, the conditions comprise a residence time of at least about 55 minutes. In some embodiments, the conditions comprise a residence time of at least about 60 minutes. In some embodiments, the conditions comprise a residence time of one or more hours.

In some embodiments, the conditions under which an isomerization suppression agent in accordance with the present teachings is added to a mixture that comprises an olefin metathesis product and residual metathesis catalyst comprise mixing, heating, and/or a residence time of at least about 2 minutes.

As presently contemplated, the addition of an isomerization suppression agent to a mixture that comprises an olefin metathesis product and residual metathesis catalyst in accordance with the present teachings can be practiced whenever it is desirable to prevent isomerization of an olefin metathesis product—particularly though not exclusively potentially labile olefin products, such as terminal olefins—during any subsequent handling and/or processing including but not limited to heating, distillation, photolytic exposure, exposure to oxidants, and the like, and combinations thereof.

In some embodiments, methods for suppressing isomerization of an olefin metathesis product in accordance with the present teachings can be used in combination with metathesis-based methods for refining natural oil feedstocks. Representative metathesis-based methods for refining natural oil feedstocks include but are not limited to those described in parent application Ser. No. 12/901,829 (published as United States Patent Application Publication No. 2011/0113679 A1), which was incorporated by reference in its entirety above. The metathesis-based methods for refining natural oil feedstocks described in parent application Ser. No. 12/901,829 are also described below with reference to FIGS. 3 and 4.

A number of valuable compositions may be targeted through the self-metathesis reaction of a natural oil feedstock, or the cross-metathesis reaction of the natural oil feedstock with a low-molecular-weight olefin, in the presence of a metathesis catalyst. Such valuable compositions may include fuel compositions, non-limiting examples of which include jet, kerosene, or diesel fuel. Additionally, transesterified products may also be targeted, non-limiting examples of which include: fatty acid methyl esters; biodiesel; 9-decenoic acid ("9DA") esters, 9-undecenoic acid ("9UDA") esters, and/or 9-dodecenoic acid ("9DDA") esters; 9DA, 9UDA, and/or 9DDA; alkali metal salts and alkaline earth metal salts of 9DA, 9UDA, and/or 9DDA; dimers of the transesterified products; and mixtures thereof.

In some embodiments, prior to a metathesis reaction, a natural oil feedstock may be treated to render the natural oil more suitable for the subsequent metathesis reaction. In some embodiments, the natural oil preferably is a vegetable oil or vegetable oil derivative, such as soybean oil.

In some embodiments, the treatment of the natural oil involves the removal of catalyst poisons, such as peroxides, which may potentially diminish the activity of the metathesis catalyst. Non-limiting examples of natural oil feedstock treatment methods to diminish catalyst poisons include those described in WO 2009/020665 A1, WO 2009/020667 A1, and U.S. Patent Application Publication Nos. 2011/0160472 A1, and U.S. patent application Ser. No. 12/672,652. In some embodiments, the natural oil feedstock is thermally treated by heating the feedstock to a temperature greater than 100° C. in the absence of oxygen and held at the temperature for a time sufficient to diminish catalyst poisons in the feedstock. In other embodiments, the temperature is between approximately 100° C. and 300° C., between approximately 120° C. and 250° C., between approximately 150° C. and 210° C., or approximately between 190 and 200° C. In some embodiments, the absence of oxygen is achieved by sparging the natural oil feedstock with nitrogen, wherein the nitrogen gas is pumped into the feedstock treatment vessel at a pressure of approximately 10 atm (150 psig).

In some embodiments, the natural oil feedstock is chemically treated under conditions sufficient to diminish the catalyst poisons in the feedstock through a chemical reaction of the catalyst poisons. In some embodiments, the feedstock is treated with a reducing agent or a cation-inorganic base composition. Non-limiting examples of reducing agents include bisulfate, borohydride, phosphine, thiosulfate, individually or combinations thereof.

In some embodiments, the natural oil feedstock is treated with an adsorbent to remove catalyst poisons. In some embodiments, the feedstock is treated with a combination of thermal and adsorbent methods. In some embodiments, the feedstock is treated with a combination of chemical and adsorbent methods. In some embodiments, the treatment involves a partial hydrogenation treatment to modify the natural oil feedstock's reactivity with the metathesis catalyst. Additional non-limiting examples of feedstock treatment are also described below when discussing the various metathesis catalysts.

Additionally, in some embodiments, the low-molecular-weight olefin may also be treated prior to the metathesis reaction. Like the natural oil treatment, the low-molecular-weight olefin may be treated to remove poisons that may impact or diminish catalyst activity.

Figure 3:
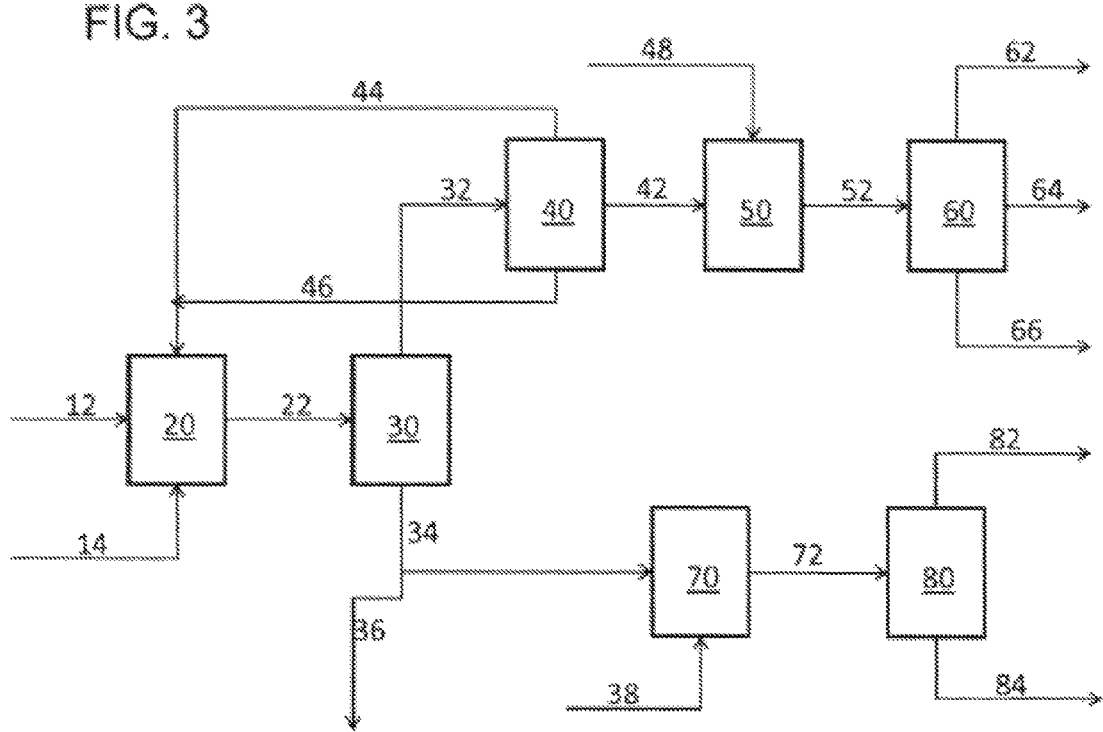
FIG. 3 is a schematic diagram of one embodiment of a process to produce a fuel composition and a transesterified product from a natural oil.

As shown in FIG. 3, after this optional treatment of the natural oil feedstock and/or low-molecular-weight olefin, the natural oil 12 is reacted with itself, or combined with a low-molecular-weight olefin 14 in a metathesis reactor 20 in the presence of a metathesis catalyst. Metathesis catalysts and metathesis reaction conditions are discussed in greater detail below. In some embodiments, in the presence of a metathesis catalyst, the natural oil 12 undergoes a self-metathesis reaction with itself. In other embodiments, in the presence of the metathesis catalyst, the natural oil 12 undergoes a cross-metathesis reaction with the low-molecular-weight olefin 14. In some embodiments, the natural oil 12 undergoes both self- and cross-metathesis reactions in parallel metathesis reactors. The self-metathesis and/or cross-metathesis reaction form a metathesized product 22 wherein the metathesized product 22 comprises olefins 32 and esters 34.

In some embodiments, the low-molecular-weight olefin 14 is in the $C_2$ to $C_6$ range. As a non-limiting example, in some embodiments, the low-molecular-weight olefin 14 may comprise at least one of the following: ethylene, propylene, 1-butene, 2-butene, isobutene, 1-pentene, 2-pentene, 3-pentene, 2-methyl-1-butene, 2-methyl-2-butene, 3-methyl-1-butene, cyclopentene, 1-hexene, 2-hexene, 3-hexene, 4-hexene, 2-methyl-1-pentene, 3-methyl-1-pentene, 4-methyl-1-pentene, 2-methyl-2-pentene, 3-methyl-2-pentene, 4-methyl-2-pentene, 2-methyl-3-pentene, and cyclohexene. In some embodiments, the low-molecular-weight olefin 14 comprises at least one of styrene and vinyl cyclohexane. In some embodiments, the low-molecular-weight olefin 14 may comprise at least one of ethylene, propylene, 1-butene, 2-butene, and isobutene. In some embodiments, the low-molecular-weight olefin 14 comprises at least one alpha-olefin or terminal olefin in the $C_2$ to $C_{10}$ range.

In some embodiments, the low-molecular-weight olefin 14 comprises at least one branched low-molecular-weight olefin in the $C_4$ to $C_{10}$ range. Non-limiting examples of branched low-molecular-weight olefins include isobutene, 3-methyl-1-butene, 2-methyl-3-pentene, and 2,2-dimethyl-3-pentene. By using these branched low-molecular-weight olefins in the metathesis reaction, the methathesized product will include branched olefins, which can be subsequently hydrogenated to iso-paraffins. In some embodiments, the branched low-molecular-weight olefins may help achieve the desired performance properties for a fuel composition, such as jet, kerosene, or diesel fuel.

As noted, it is possible to use a mixture of various linear or branched low-molecular-weight olefins in the reaction to achieve the desired metathesis product distribution. In some embodiments, a mixture of butenes (1-butene, 2-butenes, and, optionally, isobutene) may be employed as the low-molecular-weight olefin, offering a low cost, commercially available feedstock instead a purified source of one particular butene. Such low cost mixed butene feedstocks are typically diluted with n-butane and/or isobutane.

In some embodiments, recycled streams from downstream separation units may be introduced to the metathesis reactor 20 in addition to the natural oil 12 and, in some embodiments, the low-molecular-weight olefin 14. For instance, in some embodiments, a $C_2$-$C_6$ recycle olefin stream or a $C_3$-$C_4$ bottoms stream from an overhead separation unit may be returned to the metathesis reactor. In some embodiments, as shown in FIG. 3, a light weight olefin stream 44 from an olefin separation unit 40 may be returned to the metathesis reactor 20. In some embodiments, the $C_3$-$C_4$ bottoms stream and the light weight olefin stream 44 are combined together and returned to the metathesis reactor 20. In some embodiments, a $C_{15+}$ bottoms stream 46 from the olefin separation unit 40 is returned to the metathesis reactor 20. In some embodiments, all of the aforementioned recycle streams are returned to the metathesis reactor 20.

The metathesis reaction in the metathesis reactor 20 produces a metathesized product 22. In some embodiments, the metathesized product 22 enters a flash vessel operated under temperature and pressure conditions which target $C_2$ or $C_2$-$C_3$ compounds to flash off and be removed overhead. The $C_2$ or $C_2$-$C_3$ light ends are comprised of a majority of hydrocarbon compounds having a carbon number of 2 or 3. In some embodiments, the $C_2$ or $C_2$-$C_3$ light ends are then sent to an overhead separation unit, wherein the $C_2$ or $C_2$-$C_3$ compounds are further separated overhead from the heavier compounds that flashed off with the $C_2$-$C_3$ compounds. These heavier compounds are typically $C_3$-$C_5$ compounds carried overhead with the $C_2$ or $C_2$-$C_3$ compounds. After separation in the overhead separation unit, the overhead $C_2$ or $C_2$-$C_3$ stream may then be used as a fuel source. These hydrocarbons have their own value outside the scope of a fuel composition, and may be used or separated at this stage for other valued compositions and applications. In some embodiments, the bottoms stream from the overhead separation unit containing mostly $C_3$-$C_5$ compounds is returned as a recycle stream to the metathesis reactor. In the flash vessel, the metathesized product 22 that does not flash overhead is sent downstream for separation in a separation unit 30, such as a distillation column.

Prior to the separation unit 30, in some embodiments, the metathesized product 22 may be introduced to an adsorbent bed to facilitate the separation of the metathesized product 22 from the metathesis catalyst. In some embodiments, the adsorbent is a clay bed. The clay bed will adsorb the metathesis catalyst, and after a filtration step, the metathesized product 22 can be sent to the separation unit 30 for further processing. In some embodiments, the adsorbent is a water soluble phosphine reagent (e.g., THMP). Catalyst may be separated with a water soluble phosphine through known liquid-liquid extraction mechanisms by decanting the aqueous phase from the organic phase. In other embodiments, the metathesized product 22 may be contacted with a reactant to deactivate or to extract the catalyst, with a representative reactant being an isomerization suppression agent in accordance with the present teachings.

In the separation unit 30, in some embodiments, the metathesized product 22 is separated into at least two product streams. In some embodiments, the metathesized product 22 is sent to the separation unit 30, or distillation column, to separate the olefins 32 from the esters 34. In some embodiments, a byproduct stream comprising $C_7$s and cyclohexadiene may be removed in a side-stream from the separation unit 30. In some embodiments, the separated olefins 32 may comprise hydrocarbons with carbon numbers up to 24. In some embodiments, the esters 34 may comprise metathesized glycerides. In other words, the lighter end olefins 32 are preferably separated or distilled overhead for processing into olefin compositions, while the esters 34, comprised mostly of compounds having carboxylic acid/ester functionality, are drawn into a bottoms stream. Based on the quality of the separation, it is possible for some ester compounds to be carried into the overhead olefin stream 32, and it is also possible for some heavier olefin hydrocarbons to be carried into the ester stream 34.

In some embodiments, the olefins 32 may be collected and sold for any number of known uses. In other embodiments, the olefins 32 are further processed in an olefin separation unit 40 and/or hydrogenation unit 50 (where the olefinic bonds are saturated with hydrogen gas 48, as described below). In other embodiments, esters 34 comprising heavier end glycerides and free fatty acids are separated or distilled as a bottoms product for further processing into various products. In some embodiments, further processing may target the production of the following non-limiting examples: fatty acid methyl esters; biodiesel; 9DA esters, 9UDA esters, and/or 9DDA esters; 9DA, 9UDA, and/or 9DDA; alkali metal salts and alkaline earth metal salts of 9DA, 9UDA, and/or 9DDA; diacids, and/or diesters of the transesterified products; and mixtures thereof. In some embodiments, further processing may target the production of $C_{15}$-$C_{18}$ fatty acids and/or esters. In other embodiments, further processing may target the production of diacids and/or diesters. In yet other embodiments, further processing may target the production of compounds having molecular weights greater than the molecular weights of stearic acid and/or linolenic acid.

As shown in FIG. 3, regarding the overhead olefins 32 from the separation unit 30, the olefins 32 may be further separated or distilled in the olefin separation unit 40 to separate the stream's various components. In some embodiments, light end olefins 44 consisting of mainly $C_2$-$C_9$ compounds may be distilled into an overhead stream from the olefin separation unit 40. In some embodiments, the light end olefins 44 are comprised of a majority of $C_3$-$C_8$ hydrocarbon compounds. In other embodiments, heavier olefins having higher carbon numbers may be separated overhead into the light end olefin stream 44 to assist in targeting a specific fuel composition. The light end olefins 44 may be recycled to the metathesis reactor 20, purged from the system for further processing and sold, or a combination of the two. In some embodiments, the light end olefins 44 may be partially purged from the system and partially recycled to the metathesis reactor 20. With regards to the other streams in the olefin separation unit 40, a heavier $C_{16+}$, $C_{18+}$, $C_{20+}$, $C_{22+}$, or $C_{24+}$ compound stream may be separated out as an olefin bottoms stream 46. This olefin bottoms stream 46 may be purged or recycled to the metathesis reactor 20 for further processing, or a combination of the two. In some embodiments, a center-cut olefin stream 42 may be separated out of the olefin distillation unit for further processing. The center-cut olefins 42 may be designed to target a selected carbon number range for a specific fuel composition. As a non-limiting example, a $C_5$-$C_{15}$ distribution may be targeted for further processing into a naphtha-type jet fuel. Alternatively, a $C_8$-$C_{16}$ distribution may be targeted for further processing into a kerosene-type jet fuel. In some embodiments, a $C_8$-$C_{25}$ distribution may be targeted for further processing into a diesel fuel.

In some embodiments, the olefins 32 may be oligomerized to form poly-alpha-olefins (PAOs) or poly-internal-olefins (PIOs), mineral oil substitutes, and/or biodiesel fuel. The oligomerization reaction may take place after the distillation unit 30 or after the overhead olefin separation unit 40. In some embodiments, byproducts from the oligomerization reactions may be recycled back to the metathesis reactor 20 for further processing.

As mentioned, in some embodiments, the olefins 32 from the separation unit 30 may be sent directly to the hydrogenation unit 50. In some embodiments, the center-cut olefins 42 from the overhead olefin separation unit 40 may be sent to the hydrogenation unit 50. Hydrogenation may be conducted according to any known method in the art for hydrogenating double bond-containing compounds such as the olefins 32 or center-cut olefins 42. In some embodiments, in the hydrogenation unit 50, hydrogen gas 48 is reacted with the olefins 32 or center-cut olefins 42 in the presence of a hydrogenation catalyst to produce a hydrogenated product 52.

In some embodiments, the olefins are hydrogenated in the presence of a hydrogenation catalyst comprising nickel, copper, palladium, platinum, molybdenum, iron, ruthenium, osmium, rhodium, or iridium, individually or in combinations thereof. Useful catalyst may be heterogeneous or homogeneous. In some embodiments, the catalysts are supported nickel or sponge nickel type catalysts.

In some embodiments, the hydrogenation catalyst comprises nickel that has been chemically reduced with hydrogen to an active state (i.e., reduced nickel) provided on a support. The support may comprise porous silica (e.g., kieselguhr, infusorial, diatomaceous, or siliceous earth) or alumina. The catalysts are characterized by a high nickel surface area per gram of nickel.

Commercial examples of supported nickel hydrogenation catalysts include those available under the trade designations "NYSOFACT", "NYSOSEL", and "NI 5248 D" (from BASF Catalysts LLC, Iselin, N.J.). Additional supported nickel hydrogenation catalysts include those commercially available under the trade designations "PRICAT 9910", "PRICAT 9920", "PRICAT 9908", "PRICAT 9936" (from Johnson Matthey Catalysts, Ward Hill, Mass.).

The supported nickel catalysts may be of the type described in U.S. Pat. No. 3,351,566, U.S. Pat. No. 6,846,772, EP 0168091, and EP 0167201. Hydrogenation may be carried out in a batch or in a continuous process and may be partial hydrogenation or complete hydrogenation. In some embodiments, the temperature ranges from about 50° C. to about 350° C., about 100° C. to about 300° C., about 150° C. to about 250° C., or about 100° C. to about 150° C. The desired temperature may vary, for example, with hydrogen gas pressure. Typically, a higher gas pressure will require a lower temperature. Hydrogen gas is pumped into the reaction vessel to achieve a desired pressure of $H_2$ gas. In some embodiments, the $H_2$ gas pressure ranges from about 15 psig (1 atm) to about 3000 psig (204.1 atm), about 15 psig (1 atm) to about 90 psig (6.1 atm), or about 100 psig (6.8 atm) to about 500 psig (34 atm). As the gas pressure increases, more specialized high-pressure processing equipment may be required. In some embodiments, the reaction conditions are "mild," wherein the temperature is approximately between approximately 50° C. and approximately 100° C. and the $H_2$ gas pressure is less than approximately 100 psig. In other embodiments, the temperature is between about 100° C. and about 150° C., and the pressure is between about 100 psig (6.8 atm) and about 500 psig (34 atm). When the desired degree of hydrogenation is reached, the reaction mass is cooled to the desired filtration temperature.

The amount of hydrogenation catalyst is typically selected in view of a number of factors including, for example, the type of hydrogenation catalyst used, the amount of hydrogenation catalyst used, the degree of unsaturation in the material to be hydrogenated, the desired rate of hydrogenation, the desired degree of hydrogenation (e.g., as measure by iodine value (IV)), the purity of the reagent, and the $H_2$ gas pressure. In some embodiments, the hydrogenation catalyst is used in an amount of about 10 weight % or less, for example, about 5 weight % or less or about 1 weight % or less.

During hydrogenation, the carbon-carbon double bond containing compounds in the olefins are partially to fully saturated by the hydrogen gas 48. In some embodiments, the resulting hydrogenated product 52 includes hydrocarbons with a distribution centered between approximately $C_{10}$ and $C_{12}$ hydrocarbons for naphtha- and kerosene-type jet fuel compositions. In some embodiments, the distribution is centered between approximately $C_{16}$ and $C_{18}$ for a diesel fuel composition.

In some embodiments, after hydrogenation, the hydrogenation catalyst may be removed from the hydrogenated product 52 using known techniques in the art, for example, by filtration. In some embodiments, the hydrogenation catalyst is removed using a plate and frame filter such as those commercially available from Sparkler Filters, Inc., Conroe Tex. In some embodiments, the filtration is performed with the assistance of pressure or a vacuum. In order to improve filtering performance, a filter aid may be used. A filter aid may be added to the product directly or it may be applied to the filter. Representative non-limiting examples of filtering aids include diatomaceous earth, silica, alumina, and carbon. Typically, the filtering aid is used in an amount of about 10 weight % or less, for example, about 5 weight % or less or about 1 weight % or less. Other filtering techniques and filtering aids also may be employed to remove the used hydrogenation catalyst. In other embodiments the hydrogenation catalyst is removed using centrifugation followed by decantation of the product.

In some embodiments, based upon the quality of the hydrogenated product 52 produced in the hydrogenation unit 50, it may be preferable to isomerize the olefin hydrogenated product 52 to assist in targeting of desired fuel properties such as flash point, freeze point, energy density, cetane number, or end point distillation temperature, among other parameters. Isomerization reactions are well-known in the art, as described in U.S. Pat. Nos. 3,150,205; 4,210,771; 5,095,169; and 6,214,764. In some embodiments, the isomerization reaction at this stage may also crack some of the $C_{15+}$ compounds remaining, which may further assist in producing a fuel composition having compounds within the desired carbon number range, such as 5 to 16 for a jet fuel composition.

In some embodiments, the isomerization may occur concurrently with the hydrogenation step in the hydrogenation unit 50, thereby targeting a desired fuel product. In other embodiments, the isomerization step may occur before the hydrogenation step (i.e., the olefins 32 or center-cut olefins 42 may be isomerized before the hydrogenation unit 50). In yet other embodiments, it is possible that the isomerization step may be avoided or reduced in scope based upon the selection of low-molecular-weight olefin(s) 14 used in the metathesis reaction.

In some embodiments, the hydrogenated product 52 comprises approximately 15-25 weight % $C_7$, approximately <5 weight % $C_8$, approximately 20-40 weight % $C_9$, approximately 20-40 weight % $C_{10}$, approximately <5 weight % $C_{11}$, approximately 15-25 weight % $C_{12}$, approximately <5 weight % $C_{13}$, approximately <5 weight % $C_{14}$, approximately <5 weight % $C_{15}$, approximately <1 weight % $C_{16}$, approximately <1 weight % $C_{17}$, and approximately <1 weight % $C_{18}+$. In some embodiments, the hydrogenated product 52 comprises a heat of combustion of at least approximately 40, 41, 42, 43 or 44 MJ/kg (as measured by ASTM D3338). In some embodiments, the hydrogenated product 52 contains less than approximately 1 mg sulfur per kg hydrogenated product (as measured by ASTM D5453). In other embodiments, the hydrogenated product 52 comprises a density of approximately 0.70-0.75 (as measured by ASTM D4052). In other embodiments, the hydrogenated product has a final boiling point of approximately 220-240° C. (as measured by ASTM D86).

The hydrogenated product 52 produced from the hydrogenation unit 50 may be used as a fuel composition, non-limiting examples of which include jet, kerosene, or diesel fuel. In some embodiments, the hydrogenated product 52 may contain byproducts from the hydrogenation, isomerization, and/or metathesis reactions. As shown in FIG. 3, the hydrogenated product 52 may be further processed in a fuel composition separation unit 60, removing any remaining byproducts from the hydrogenated product 52, such as hydrogen gas, water, $C_2$-$C_9$ hydrocarbons, or $C_{15}+$ hydrocarbons, thereby producing a targeted fuel composition. In some embodiments, the hydrogenated product 52 may be separated into the desired fuel $C_9$-$C_{15}$ product 64, and a light-ends $C_2$-$C_9$ fraction 62 and/or a $C_{15}+$ heavy-ends fraction 66. Distillation may be used to separate the fractions. Alternatively, in other embodiments, such as for a naphtha- or kerosene-type jet fuel composition, the heavy ends fraction 66 can be separated from the desired fuel product 64 by cooling the hydrogenated product 52 to approximately −40° C., −47° C., or −65° C. and then removing the solid, heavy ends fraction 66 by techniques known in the art such as filtration, decantation, or centrifugation.

With regard to the esters 34 from the distillation unit 30, in some embodiments, the esters 34 may be entirely withdrawn as an ester product stream 36 and processed further or sold for its own value, as shown in FIG. 3. As a non-limiting example, the esters 34 may comprise various triglycerides that could be used as a lubricant. Based upon the quality of separation between olefins and esters, the esters 34 may comprise some heavier olefin components carried with the triglycerides. In other embodiments, the esters 34 may be further processed in a biorefinery or another chemical or fuel processing unit known in the art, thereby producing various products such as biodiesel or specialty chemicals that have higher value than that of the triglycerides, for example. Alternatively, in some embodiments, the esters 34 may be partially withdrawn from the system and sold, with the remainder further processed in the biorefinery or another chemical or fuel processing unit known in the art.

In some embodiments, the ester stream 34 is sent to a transesterification unit 70. Within the transesterification unit 70, the esters 34 are reacted with at least one alcohol 38 in the presence of a transesterification catalyst. In some embodiments, the alcohol comprises methanol and/or ethanol. In some embodiments, the transesterification reaction is conducted at approximately 60-70° C. and approximately 1 atm. In some embodiments, the transesterification catalyst is a homogeneous sodium methoxide catalyst. Varying amounts of catalyst may be used in the reaction, and, in some embodiments, the transesterification catalyst is present in the amount of approximately 0.5-1.0 weight % of the esters 34.

The transesterification reaction may produce transesterified products 72 including saturated and/or unsaturated fatty acid methyl esters ("FAME"), glycerin, methanol, and/or free fatty acids. In some embodiments, the transesterified products 72, or a fraction thereof, may comprise a source for biodiesel. In some embodiments, the transesterified products 72 comprise 9DA esters, 9UDA esters, and/or 9DDA esters. Non-limiting examples of 9DA esters, 9UDA esters and 9DDA esters include methyl 9-decenoate ("9-DAME"), methyl 9-undecenoate ("9-UDAME"), and methyl 9-dodecenoate ("9-DDAME"), respectively. As a non-limiting example, in a transesterification reaction, a 9DA moiety of a metathesized glyceride is removed from the glycerol backbone to form a 9DA ester.

In some embodiments, a glycerin alcohol may be used in the reaction with a glyceride stream. This reaction may produce monoglycerides and/or diglycerides.

In some embodiments, the transesterified products 72 from the transesterification unit 70 can be sent to a liquid-liquid separation unit, wherein the transesterified products 72 (i.e., FAME, free fatty acids, and/or alcohols) are separated from glycerin. Additionally, in some embodiments, the glycerin byproduct stream may be further processed in a secondary separation unit, wherein the glycerin is removed and any remaining alcohols are recycled back to the transesterification unit 70 for further processing.

In some embodiments, the transesterified products 72 are further processed in a water-washing unit. In this unit, the transesterified products undergo a liquid-liquid extraction when washed with water. Excess alcohol, water, and glycerin are removed from the transesterified products 72. In some embodiments, the water-washing step is followed by a drying unit in which excess water is further removed from the desired mixture of esters (i.e., specialty chemicals). Such specialty chemicals include non-limiting examples such as 9DA, 9UDA, and/or 9DDA, alkali metal salts and alkaline earth metal salts of the preceding, individually or in combinations thereof.

In some embodiments, the specialty chemical (e.g., 9DA) may be further processed in an oligomerization reaction to form a lactone, which may serve as a precursor to a surfactant.

In some embodiments, the transesterifed products 72 from the transesterification unit 70 or specialty chemicals from the water-washing unit or drying unit are sent to an ester distillation column 80 for further separation of various individual or groups of compounds, as shown in FIG. 3. This separation may include, but is not limited to, the separation of 9DA esters, 9UDA esters, and/or 9DDA esters. In some embodiments, the 9DA ester 82 may be distilled or individually separated from the remaining mixture 84 of transesterified products or specialty chemicals. In certain process conditions, the 9DA ester 82 should be the lightest component in the transesterified product or specialty chemical stream, and come out at the top of the ester distillation column 80. In some embodiments, the remaining mixture 84, or heavier components, of the transesterified products or specialty chemicals may be separated off the bottom end of the column. In some embodiments, this bottoms stream 84 may potentially be sold as biodiesel.

The 9DA esters, 9UDA esters, and/or 9DDA esters may be further processed after the distillation step in the ester distillation column. In some embodiments, under known operating conditions, the 9DA ester, 9UDA ester, and/or 9DDA ester may then undergo a hydrolysis reaction with water to form 9DA, 9UDA, and/or 9DDA, alkali metal salts and alkaline earth metal salts of the preceding, individually or in combinations thereof.

In some embodiments, the fatty acid methyl esters from the transesterified products 72 may be reacted with each other to form other specialty chemicals such as dimers.

Figure 4:
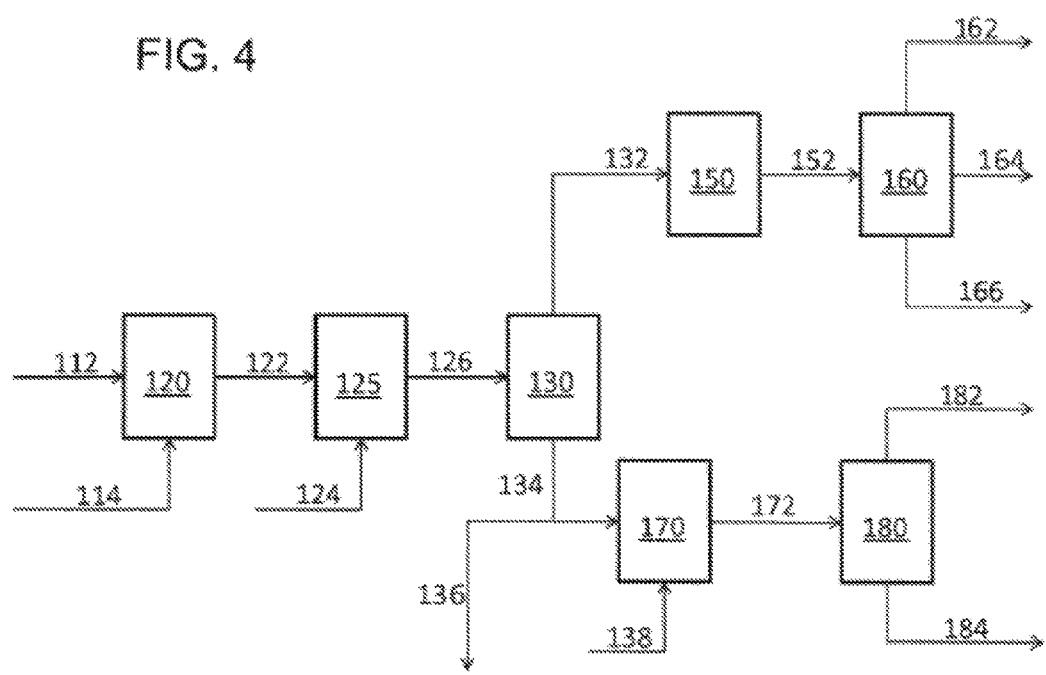
FIG. 4 is a schematic diagram of a second embodiment of a process to produce a fuel composition and a transesterified product from a natural oil.

FIG. 4 represents some embodiments for processing the natural oil into fuel compositions and specialty chemicals. As described above, the natural oil feedstock and/or low-molecular-weight olefin in FIG. 4 may undergo a pretreatment step prior to the metathesis reaction. In FIG. 4, the natural oil feedstock 112 is reacted with itself, or combined with a low-molecular-weight olefin 114 in a metathesis reactor 120 in the presence of a metathesis catalyst. In some embodiments, in the presence of a metathesis catalyst, the natural oil 112 undergoes a self-metathesis reaction with itself. In other embodiments, in the presence of the metathesis catalyst, the natural oil 112 undergoes a cross-metathesis reaction with the low-molecular-weight olefin 114. In some embodiments, the natural oil 112 undergoes both self- and cross-metathesis reactions in parallel metathesis reactors. The self-metathesis and/or cross-metathesis reaction form a metathesized product 122 wherein the metathesized product 122 comprises olefins 132 and esters 134.

In some embodiments, the low-molecular-weight olefin 114 is in the $C_2$ to $C_6$ range. As a non-limiting example, in some embodiments, the low-molecular-weight olefin 114 may comprise at least one of the following: ethylene, propylene, 1-butene, 2-butene, isobutene, 1-pentene, 2-pentene, 3-pentene, 2-methyl-1-butene, 2-methyl-2-butene, 3-methyl-1-butene, cyclopentene, 1-hexene, 2-hexene, 3-hexene, 4-hexene, 2-methyl-1-pentene, 3-methyl-1-pentene, 4-methyl-1-pentene, 2-methyl-2-pentene, 3-methyl-2-pentene, 4-methyl-2-pentene, 2-methyl-3-pentene, and cyclohexene. In some embodiments, the low-molecular-weight olefin 114 comprises at least one of styrene and vinyl cyclohexane. In some embodiments, the low-molecular-weight olefin 114 may comprise at least one of ethylene, propylene, 1-butene, 2-butene, and isobutene. In some embodiments, the low-molecular-weight olefin 114 comprises at least one alpha-olefin or terminal olefin in the $C_2$ to $C_{10}$ range.

In some embodiments, the low-molecular-weight olefin 114 comprises at least one branched low-molecular-weight olefin in the $C_4$ to $C_{10}$ range. Non-limiting examples of branched low-molecular-weight olefins include isobutene, 3-methyl-1-butene, 2-methyl-3-pentene, and 2,2-dimethyl-3-pentene. In some embodiments, the branched low-molecular-weight olefins may help achieve the desired performance properties for the fuel composition, such as jet, kerosene, or diesel fuel.

As noted, it is possible to use a mixture of various linear or branched low-molecular-weight olefins in the reaction to achieve the desired metathesis product distribution. In some embodiments, a mixture of butenes (1-butene, 2-butene, and isobutene) may be employed as the low-molecular-weight olefin 114.

In some embodiments, recycled streams from downstream separation units may be introduced to the metathesis reactor 120 in addition to the natural oil 112 and, in some embodiments, the low-molecular-weight olefin 114 to improve the yield of the targeted fuel composition and/or targeted transesterification products.

After the metathesis unit 120 and before the hydrogenation unit 125, in some embodiments, the metathesized product 122 may be introduced to an adsorbent bed to facilitate the separation of the metathesized product 122 from the metathesis catalyst. In some embodiments, the adsorbent is a clay. The clay will adsorb the metathesis catalyst, and after a filtration step, the metathesized product 122 can be sent to the hydrogenation unit 125 for further processing. In some embodiments, the adsorbent is a water soluble phosphine reagent (e.g., THMP). Catalyst may be separated from the reaction mixture with a water soluble phosphine through known liquid-liquid extraction mechanisms by decanting the aqueous phase from the organic phase. In other embodiments, addition of a reactant to deactivate or extract the catalyst might be used, with a representative reactant being an isomerization suppression agent in accordance with the present teachings.

As shown in FIG. 4, the metathesis product 122 is sent to a hydrogenation unit 125, wherein the carbon-carbon double bonds in the olefins and esters are partially to fully saturated with hydrogen gas 124. As described above, hydrogenation may be conducted according to any known method in the art for hydrogenating double bond-containing compounds such as the olefins and esters present in the metathesis product 122. In some embodiments, in the hydrogenation unit 125, hydrogen gas 124 is reacted with the metathesis product 122 in the presence of a hydrogenation catalyst to produce a hydrogenated product 126 comprising partially to fully hydrogenated paraffins/olefins and partially to fully hydrogenated esters.

Typical hydrogenation catalysts have been already described with reference to embodiments in FIG. 3. Reaction conditions have also been described. In some embodiments, the temperature ranges from about 50° C. to about 350° C., about 100° C. to about 300° C., about 150° C. to about 250° C., or about 50° C. to about 150° C. The desired temperature may vary, for example, with hydrogen gas pressure. Typically, a higher gas pressure might allow the use of a lower reaction temperature. Hydrogen gas is pumped into the reaction vessel to achieve a desired pressure of $H_2$ gas. In some embodiments, the $H_2$ gas pressure ranges from about 15 psig (1 atm) to about 3000 psig (204.1 atm), or about 15 psig (1 atm) to about 500 psig (34 atm). In some embodiments, the reaction conditions are "mild," wherein the temperature is approximately between approximately 50° C. and approximately 150° C. and the $H_2$ gas pressure is less than approximately 400 psig. When the desired degree of hydrogenation is reached, the reaction mass is cooled to the desired filtration temperature.

During hydrogenation, the carbon-carbon double bonds are partially to fully saturated by the hydrogen gas 124. In some embodiments, the olefins in the metathesis product 122 are reacted with hydrogen to form a fuel composition comprising only or mostly paraffins. Additionally, the esters from the metathesis product are fully or nearly fully saturated in the hydrogenation unit 125. In some embodiments, the resulting hydrogenated product 126 includes only partially saturated paraffins/olefins and partially saturated esters.

In FIG. 4, the hydrogenated product 126 is sent to a separation unit 130 to separate the product into at least two product streams. In some embodiments, the hydrogenated product 126 is sent to the separation unit 130, or distillation column, to separate the partially to fully saturated paraffins/olefins, or fuel composition 132, from the partially to fully saturated esters 134. In some embodiments, a byproduct stream comprising $C_7$s and cyclohexadiene may be removed in a sidestream from the separation unit 130. In some embodiments, the fuel composition 132 may comprise hydrocarbons with carbon numbers up to 24. In some embodiments, the fuel composition 132 consists essentially of saturated hydrocarbons.

In some embodiments, the esters 134 may comprise metathesized, partially to fully hydrogenated glycerides. In other words, the lighter end paraffins/olefins 132 are preferably separated or distilled overhead for processing into fuel compositions, while the esters 134, comprised mostly of compounds having carboxylic acid/ester functionality, are drawn as a bottoms stream. Based on the quality of the separation, it is possible for some ester compounds to be carried into the overhead paraffin/olefin stream 132, and it is also possible for some heavier paraffin/olefin hydrocarbons to be carried into the ester stream 134.

In some embodiments, it may be preferable to isomerize the fuel composition 132 to improve the quality of the product stream and target the desired fuel properties such as flash point, freeze point, energy density, cetane number, or end point distillation temperature, among other parameters. Isomerization reactions are well-known in the art, as described in U.S. Pat. Nos. 3,150,205; 4,210,771; 5,095,169; and 6,214,764. In some embodiments, as shown in FIG. 4, the fuel composition 132 is sent to an isomerization reaction unit 150 wherein an isomerized fuel composition 152 is produced. Under typical reaction conditions, the isomerization reaction at this stage may also crack some of the compounds present in stream 132, which may further assist in producing an improved fuel composition having compounds within the desired carbon number range, such as 5 to 16 for a jet fuel composition.

In some embodiments, the fuel composition 132 or isomerized fuel composition 152 comprises approximately 15-25 weight % $C_7$, approximately <5 weight % $C_8$, approximately 20-40 weight % $C_9$, approximately 20-40 weight % $C_{10}$, approximately <5 weight % $C_{11}$, approximately 15-25 weight % $C_{12}$, approximately <5 weight % $C_{13}$, approximately <5 weight % $C_{14}$, approximately <5 weight % $C_{15}$, approximately <1 weight % $C_{16}$, approximately <1 weight % $C_{17}$, and approximately <1 weight % $C_{18}$+. In some embodiments, the fuel composition 132 or isomerized fuel composition 152 comprises a heat of combustion of at least approximately 40, 41, 42, 43 or 44 MJ/kg (as measured by ASTM D3338). In some embodiments, the fuel composition 132 or isomerized fuel composition 152 contains less than approximately 1 mg sulfur per kg fuel composition (as measured by ASTM D5453). In other embodiments, the fuel composition 132 or isomerized fuel composition 152 comprises a density of approximately 0.70-0.75 (as measured by ASTM D4052). In other embodiments, the fuel composition 132 or isomerized fuel composition 152 has a final boiling point of approximately 220-240° C. (as measured by ASTM D86).

The fuel composition 132 or the isomerized fuel composition 152 may be used as jet, kerosene, or diesel fuel, depending on the fuel's characteristics. In some embodiments, the fuel composition may contain byproducts from the hydrogenation, isomerization, and/or metathesis reactions. The fuel composition 132 or isomerized fuel composition 152 may be further processed in a fuel composition separation unit 160 as shown in FIG. 4. The separation unit 160 may be operated to remove any remaining byproducts from the mixture, such as hydrogen gas, water, $C_2$-$C_9$ hydrocarbons, or $C_{15}$+ hydrocarbons, thereby producing a desired fuel product 164. In some embodiments, the mixture may be separated into the desired fuel $C_9$-$C_{15}$ product 164, and a light-ends $C_2$-$C_9$ (or $C_3$-$C_8$) fraction 162 and/or a $C_{18}$+ heavy-ends fraction 166. Distillation may be used to separate the fractions. Alternatively, in other embodiments, such as for a naphtha- or kerosene-type jet fuel composition, the heavy ends fraction 166 can be separated from the desired fuel product 164 by cooling the paraffins/olefins to approximately −40° C., −47° C., or −65° C. and then removing the solid, heavy ends fraction 166 by techniques known in the art such as filtration, decantation, or centrifugation.

With regard to the partially to fully saturated esters 134 from the separation unit 130, in some embodiments, the esters 134 may be entirely withdrawn as a partially to fully hydrogenated ester product stream 136 and processed further or sold for its own value, as shown in FIG. 4. As a non-limiting example, the esters 134 may comprise various partially to fully saturated triglycerides that could be used as a lubricant. Based upon the quality of separation between the paraffins/olefins (fuel composition 132) and the esters, the esters 134 may comprise some heavier paraffin and olefin components carried with the triglycerides. In other embodiments, the esters 134 may be further processed in a biorefinery or another chemical or fuel processing unit known in the art, thereby producing various products such as biodiesel or specialty chemicals that have higher value than that of the triglycerides, for example. Alternatively, the esters 134 may be partially withdrawn from the system and sold, with the remainder further processed in the biorefinery or another chemical or fuel processing unit known in the art.

In some embodiments, the ester stream 134 is sent to a transesterification unit 170. Within the transesterification unit 170, the esters 134 are reacted with at least one alcohol 138 in the presence of a transesterification catalyst. In some embodiments, the alcohol comprises methanol and/or ethanol. In some embodiments, the transesterification reaction is conducted at approximately 60-70° C. and 1 atm. In some embodiments, the transesterification catalyst is a homogeneous sodium methoxide catalyst. Varying amounts of catalyst may be used in the reaction, and, in some embodiments, the transesterification catalyst is present in the amount of approximately 0.5-1.0 weight % of the esters 134.

The transesterification reaction may produce transesterified products 172 including saturated and/or unsaturated fatty acid methyl esters ("FAME"), glycerin, methanol, and/or free fatty acids. In some embodiments, the transesterified products 172, or a fraction thereof, may comprise a source for biodiesel. In some embodiments, the transesterified products 172 comprise decenoic acid esters, decanoic acid esters, undecenoic acid esters, undecanoic acid esters, dodecenoic acid esters, and/or dodecaonic acid esters. In some embodiments, in a transesterification reaction, a decanoic acid moiety of a metathesized glyceride is removed from the glycerol backbone to form a decanoic acid ester. In some embodiments, a decenoic acid moiety of a metathesized glyceride is removed from the glycerol backbone to form a decenoic acid ester.

In some embodiments, a glycerin alcohol may be used in the reaction with a triglyceride stream 134. This reaction may produce monoglycerides and/or diglycerides.

In some embodiments, the transesterified products 172 from the transesterification unit 170 can be sent to a liquid-liquid separation unit, wherein the transesterified products 172 (i.e., FAME, free fatty acids, and/or alcohols) are separated from glycerin. Additionally, in some embodiments, the glycerin byproduct stream may be further processed in a secondary separation unit, wherein the glycerin is removed and any remaining alcohols are recycled back to the transesterification unit 170 for further processing.

In some embodiments, the transesterified products 172 are further processed in a water-washing unit. In this unit, the transesterified products undergo a liquid-liquid extraction when washed with water. Excess alcohol, water, and glycerin are removed from the transesterified products 172. In some embodiments, the water-washing step is followed by a drying unit in which excess water is further removed from the desired mixture of esters (i.e., specialty chemicals). Such hydrogenated specialty chemicals include non-limiting examples such as decenoic acid, decanoic acid, undecenoic acid, undecanoic acid, dodecenoic acid, dodecanoic acid, and mixtures thereof.

As shown in FIG. 4, the transesterifed products 172 from the transesterification unit 170 or specialty chemicals from the water-washing unit or drying unit may be sent to an ester distillation column 180 for further separation of various individual or groups of compounds. This separation may include, but is not limited to, the separation of decenoic acid esters, decanoic acid esters, undecenoic acid esters, undecanoic acid esters, dodecenoic acid esters, and/or dodecanoic acid esters. In some embodiments, a decanoic acid ester or decenoic acid ester 182 may be distilled or individually separated from the remaining mixture 184 of transesterified products or specialty chemicals. In certain process conditions, the decanoic acid ester or decenoic acid ester 182 should be the lightest component in the transesterified product or specialty chemical stream, and come out at the top of the ester distillation column 180. In some embodiments, the remaining mixture 184, or heavier components, of the transesterified products or specialty chemicals may be separated off the bottom end of the column. In some embodiments, this bottoms stream 184 may potentially be sold as biodiesel.

The decenoic acid esters, decanoic acid esters, undecenoic acid esters, undecanoic acid esters, dodecenoic acid esters, and/or dodecanoic acid esters may be further processed after the distillation step in the ester distillation column. In some embodiments, under known operating conditions, the decenoic acid ester, decanoic acid ester, undecenoic acid ester, undecanoic acid ester, dodecenoic acid ester, and/or dodecanoic acid ester may then undergo a hydrolysis reaction with water to form decenoic acid, decanoic acid, undecenoic acid undecanoic acid, dodecenoic acid, and/or dodecanoic acid.

As noted, the self-metathesis of the natural oil or the cross-metathesis between the natural oil and low-molecular-weight olefin occurs in the presence of a metathesis catalyst. The phrase "metathesis catalyst" includes any catalyst or catalyst system that catalyzes a metathesis reaction. Any known or future-developed metathesis catalyst may be used, individually or in combination with one or more additional catalysts. Non-limiting exemplary metathesis catalysts and process conditions are described in WO 2009/020667 A1 (e.g., pp. 18-47). A number of the metathesis catalysts as shown are manufactured by Materia, Inc. (Pasadena, Calif.).

The metathesis process can be conducted under any conditions adequate to produce the desired metathesis products. For example, stoichiometry, atmosphere, solvent, temperature, and pressure can be selected by one skilled in the art to produce a desired product and to minimize undesirable byproducts. The metathesis process may be conducted under an inert atmosphere. Similarly, if a reagent is supplied as a gas, an inert gaseous diluent can be used. The inert atmosphere or inert gaseous diluent typically is an inert gas, meaning that the gas does not interact with the metathesis catalyst to substantially impede catalysis. For example, particular inert gases are selected from the group consisting of helium, neon, argon, nitrogen, individually or in combinations thereof.

In some embodiments, the metathesis catalyst is dissolved in a solvent prior to conducting the metathesis reaction. In some embodiments, the solvent chosen may be selected to be substantially inert with respect to the metathesis catalyst. For example, substantially inert solvents include, without limitation, aromatic hydrocarbons, such as benzene, toluene, xylenes, etc.; halogenated aromatic hydrocarbons, such as chlorobenzene and dichlorobenzene; aliphatic solvents, including pentane, hexane, heptane, cyclohexane, etc.; and chlorinated alkanes, such as dichloromethane, chloroform, dichloroethane, etc. In some embodiments, the solvent comprises toluene.

The metathesis reaction temperature may be a rate-controlling variable where the temperature is selected to provide a desired product at an acceptable rate. In some embodiments, the metathesis reaction temperature is greater than about −40° C., greater than about −20° C., greater than about 0° C., or greater than about 10° C. In some embodiments, the metathesis reaction temperature is less than about 150° C., or less than about 120° C. In some embodiments, the metathesis reaction temperature is between about 10° C. and about 120° C.

The metathesis reaction can be run under any desired pressure. Typically, it will be desirable to maintain a total pressure that is high enough to keep the cross-metathesis reagent in solution. Therefore, as the molecular weight of the cross-metathesis reagent increases, the lower pressure range typically decreases since the boiling point of the cross-metathesis reagent increases. The total pressure may be selected to be greater than about 0.1 atm (10 kPa), in some embodiments greater than about 0.3 atm (30 kPa), or greater than about 1 atm (100 kPa). Typically, the reaction pressure is no more than about 70 atm (7000 kPa), in some embodiments no more than about 30 atm (3000 kPa). A non-limiting exemplary pressure range for the metathesis reaction is from about 1 atm (100 kPa) to about 30 atm (3000 kPa).

By way of non-limiting example, in reference to FIG. 3, methods for suppressing isomerization of an olefin metathesis product in accordance with the present teachings can be implemented prior to introducing the metathesized product 22 to the separation unit 30 (e.g., a distillation column) and/or at one or more additional stages in the process. By way of further non-limiting example, in reference to FIG. 4, methods for suppressing isomerization of an olefin metathesis product in accordance with the present teachings can be implemented prior to introducing the metathesized product 122 to the separation unit 130 and/or the hydrogenation unit 125 and/or at one or more additional stages in the process. Moreover, in some embodiments, when the isomerization suppression agent has sufficient thermal stability (e.g., a phosphite ester having a sufficiently high molecular weight), the isomerization suppression agent can be left in the mixture comprising the olefin metathesis product and carried along for further processing (e.g., to the separation units 30 and/or 130 shown, respectively, in FIGS. 1 and 2 of United States Patent Application Publication No. 2011/0113679 A1 and/or to one or more additional units in these or analogous systems).

Figure 5:
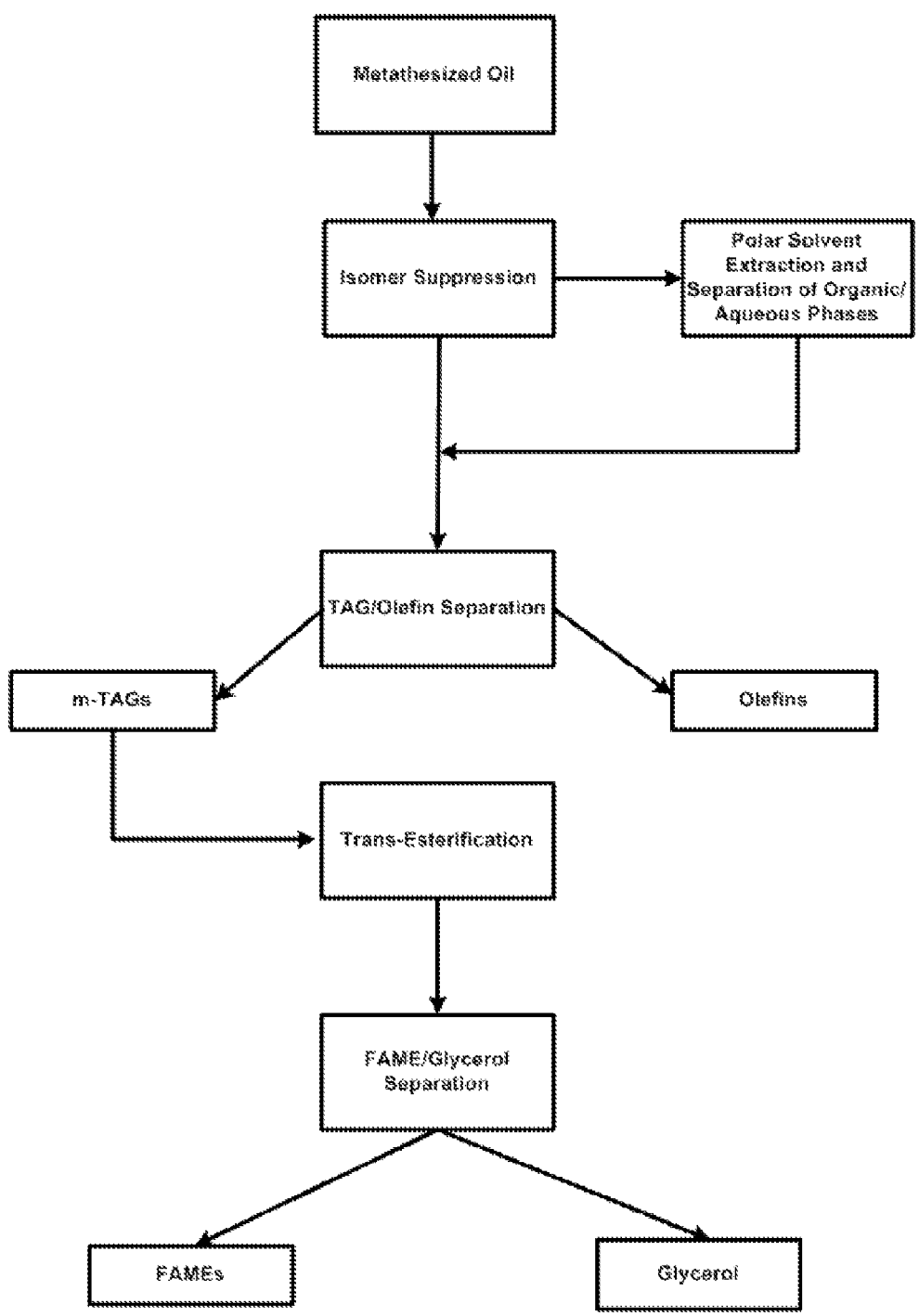
FIG. 5 is a process flow diagram depicting a representative scheme for isomerization suppression in an olefin metathesis product and shows an optional extraction, separation, and transesterification.

In some embodiments, as shown in FIG. 5, methods for suppressing isomerization of an olefin metathesis product in accordance with the present teachings may optionally further comprise a polar solvent wash—in other words, extracting the mixture to which an isomerization suppression agent has been added with a polar solvent. However, as described above, in some embodiments it may not be possible, necessary, and/or desirable to remove an isomerization suppression agent in accordance with the present teachings via extraction with a polar solvent prior to further processing, which in some embodiments includes but is not limited to processing involving heating.

In some embodiments, the metathesis mixture (e.g., a neat mixture that comprises, in some embodiments, natural oil, residual metathesis catalyst, olefin metathesis product and, optionally, low-molecular-weight olefin) is substantially immiscible with the polar solvent, such that two layers are formed. For the sake of convenience, these immiscible layers are described herein as being "aqueous" and "organic" although, in some embodiments, the so-called aqueous layer may be comprised of a polar solvent other than or in addition to water. In some embodiments, the polar solvent extraction (e.g., washing with water) can serve to remove at least a portion of the isomerization suppression agent—particularly though not exclusively when the isomerization suppression agent is at least partially hydrolyzable (e.g., in some embodiments, a phosphite ester having a low molecular weight, including but not limited to trimethyl phosphite, triethyl phosphite, and a combination thereof)—which, in some embodiments, can result in the conversion of an isomerization suppression agent in accordance with the present teachings (e.g., an ester of a phosphorous oxo acid) into a corresponding acid.

In some embodiments, when extraction with a polar solvent is desired, the extracting comprises high shear mixing although such mixing, in some embodiments, may contribute to undesirable emulsion formation. In some embodiments, the extracting comprises low-intensity mixing (e.g., stirring that is not high shear). The present teachings are in no way restricted to any particular type or duration of mixing. However, for purposes of illustration, in some embodiments, the extracting comprises mixing the polar solvent and the mixture together for at least about 1 minute. In some embodiments, the mixture and the polar solvent are mixed together for at least about 2 minutes, in some embodiments for at least about 5 minutes, in some embodiments for at least about 10 minutes, in some embodiments for at least about 15 minutes, in some embodiments for at least about 20 minutes, in some embodiments for at least about 25 minutes, in some embodiments for at least about 30 minutes, in some embodiments for at least about 35 minutes, in some embodiments for at least about 40 minutes, in some embodiments for at least about 45 minutes, in some embodiments for at least about 50 minutes, in some embodiments for at least about 55 minutes, and in some embodiments for at least about 60 minutes.

When extraction with a polar solvent is desired, the present teachings are in no way restricted to any particular amount of polar solvent added to the mixture for the extracting. However, for purposes of illustration, in some embodiments, the amount by weight of polar solvent (e.g., water) added to the mixture for the extracting is more than the weight of the mixture. In some embodiments, the amount by weight of polar solvent (e.g., water) added to the mixture for the extracting is less than the weight of the mixture. In some embodiments, the weight ratio of the mixture to the water added to the mixture is at least about 1:1, in some embodiments at least about 2:1, in some embodiments at least about 3:1, in some embodiments at least about 4:1, in some embodiments at least about 5:1, in some embodiments at least about 6:1, in some embodiments at least about 7:1, in some embodiments at least about 8:1, in some embodiments at least about 9:1, and in some embodiments at least about 10:1.

In some embodiments, when extraction with a polar solvent is desired, methods for suppressing isomerization of an olefin metathesis product in accordance with the present teachings further comprise allowing a settling period following the polar solvent wash to promote phase separation. The present teachings are in no way restricted to any particular duration of settling period. However, for purposes of illustration, in some embodiments, the settling period is at least about 1 minute. In some embodiments, the settling period is at least about 2 minutes. In some embodiments, the settling period is at least about 5 minutes. In some embodiments, the settling period is at least about 10 minutes. In some embodiments, the settling period is at least about 15 minutes.

In some embodiments, when extraction with a polar solvent is desired, methods for suppressing isomerization of an olefin metathesis product in accordance with the present teachings optionally further comprise separating an organic phase from an aqueous phase, as shown in FIG. 5. In some embodiments, particularly though not exclusively when the isomerization suppression agent is at least partially hydrolysable, a majority of the isomerization suppression agent is distributed in the aqueous phase. In some embodiments, a majority of the olefin metathesis product is distributed in the organic phase. In some embodiments, a majority of the isomerization suppression agent is distributed in the aqueous phase and a majority of the olefin metathesis product is distributed in the organic phase.

In some embodiments, when extraction with a polar solvent is desired, such that an organic phase is separated from an aqueous phase, and when the residual metathesis catalyst in the mixture comprises ruthenium, a majority of the ruthenium is carried into an organic phase and a minority of the ruthenium is distributed in an aqueous phase. In some embodiments, at least about 51% of the ruthenium is extracted into an organic phase. In some embodiments, at least about 60% of the ruthenium is extracted into an organic phase. In some embodiments, at least about 65% of the ruthenium is extracted into an organic phase. In some embodiments, at least about 70% of the ruthenium is extracted into an organic phase. In some embodiments, at least about 75% of the ruthenium is extracted into an organic phase. In some embodiments, at least about 80% of the ruthenium is extracted into an organic phase. In some embodiments, at least about 85% of the ruthenium is extracted into an organic phase. In some embodiments, at least about 90% of the ruthenium is extracted into an organic phase.

In some embodiments, it is observed that removing excess isomerization suppression agent from a cross-metathesized oil by washing with water can be accompanied by a loss in the overall efficacy of isomerization suppression. While neither desiring to be bound by any particular theory nor intending to limit in any measure the scope of the appended claims or their equivalents, it is presently believed that the reduction in isomerization suppression sometimes observed after a water wash is merely an artifact of handling. Moreover, it is presently believed that the effect can be mitigated and/or eliminated by using slightly different experimental conditions including but not limited to using higher concentrations of isomerization suppression agent, handling the material obtained from the suppression treatment under an inert atmosphere (e.g., nitrogen), and/or the like.

In some embodiments, as shown in FIG. 5, a method in accordance with the present teachings for suppressing isomerization of an olefin metathesis product produced in a metathesis reaction comprises: (a) adding an isomerization suppression agent to a mixture that comprises the olefin metathesis product and residual metathesis catalyst from the metathesis reaction under conditions that are sufficient to passivate at least a portion of the residual metathesis catalyst; and (b) processing the mixture to provide a fraction that comprises the olefin metathesis product and/or a derivative thereof, wherein the isomerization suppression agent is not removed from the mixture prior to the processing. The isomerization suppression agent comprises (i) a salt and/or an ester of a phosphorous oxo acid, and/or (ii) a derivative of the phosphorous oxo acid in which at least one P—H bond has been replaced by a P—C bond, and/or (iii) a salt and/or an ester of the derivative. In some embodiments, the ester of a phosphorous oxo acid is substantially water-insoluble. In some embodiments, the residual metathesis catalyst comprises ruthenium. In some embodiments, the fraction that comprises the olefin metathesis product and/or a derivative thereof is comprised primarily thereof (e.g., the olefin metathesis product and/or the derivative thereof account for at least about 51 wt % of the fraction, in some embodiments at least about 65 wt %, in some embodiments at least about 70 wt %, in some embodiments at least about 75 wt %, in some embodiments at least about 80 wt %, in some embodiments at least about 85 wt %, in some embodiments at least about 90 wt %, and in some embodiments at least about 95 wt %.

In some embodiments, the processing of the mixture comprises heating. In some embodiments, the processing of the mixture comprises heating to a temperature of at least about 100° C., in some embodiments at least about 125° C., in some embodiments at least about 150° C., in some embodiments at least about 175° C., in some embodiments at least about 200° C., in some embodiments at least about 225° C., and in some embodiments at least about 250° C. In some embodiments, the processing comprises distillation. In some embodiments, the processing comprises transesterification. In some embodiments, the processing comprises distillation and transesterification.

In some embodiments—particularly though not exclusively those involving metathesis-based methods for refining natural oil feedstocks—methods for suppressing isomerization of an olefin metathesis product in accordance with the present teachings further comprise separating the olefin metathesis product into a metathesized triacylglyceride (m-TAG) fraction and an olefinic fraction, as shown in FIG. 5. A majority of the triacylglyceride fraction is comprised by molecules comprising one or more carbon-carbon double bonds and, optionally, one or more additional functional groups, whereas a majority of the olefinic fraction is comprised by molecules comprising one or more unsaturated carbon-carbon bonds and no additional functional groups.

In some embodiments—particularly though not exclusively those involving metathesis-based methods for refining natural oil feedstocks—methods for suppressing isomerization of an olefin metathesis product in accordance with the present teachings further comprise transesterifying the triacylglyceride fraction to produce one or a plurality of transesterification products, as shown in FIG. 5. In some embodiments, the transesterification products comprise fatty acid methyl esters (FAMEs). In some embodiments—particularly though not exclusively those involving metathesis-based methods for refining natural oil feedstocks—methods for suppressing isomerization of an olefin metathesis product in accordance with the present teachings further comprise separating the transesterification products from a glycerol-containing phase, as shown in FIG. 5.

In some embodiments—particularly though not exclusively those involving metathesis-based methods for refining natural oil feedstocks—methods for suppressing isomerization of an olefin metathesis product in accordance with the present teachings further comprise separating the olefin metathesis product into a triacylglyceride fraction and an olefinic fraction, transesterifying the triacylglyceride fraction to produce one or a plurality of transesterification products (e.g., FAMEs), and separating the transesterification products from a glycerol-containing phase, as shown in FIG. 5. In some embodiments, the residual metathesis catalyst in the mixture comprises ruthenium. In some embodiments, a majority of the ruthenium is distributed between the glycerol-containing phase and the transesterification products.

In some embodiments, a method of refining a natural oil in accordance with the present teachings comprises (a) providing a feedstock comprising a natural oil; (b) reacting the feedstock in the presence of a metathesis catalyst to form a metathesized product comprising an olefin and an ester; (c) passivating the metathesis catalyst with an agent selected from the group consisting of (i) a salt and/or an ester of a phosphorous oxo acid, (ii) a derivative of the phosphorous oxo acid in which at least one P—H bond has been replaced by a P—C bond, (iii) a salt and/or an ester of the derivative, and (iv) combinations thereof; (d) separating the olefin in the metathesized product from the ester in the metathesized product; and (e) transesterifying the ester in the presence of an alcohol to form a transesterified product and/or hydrogenating the olefin to form a fully or partially saturated hydrogenated product.

As noted above, the use of THMP as an isomerization suppressor—particularly on an industrial scale—is problematic in view of its commercial availability and pricing, the fact that a carcinogenic byproduct, formaldehyde, typically accompanies its preparation, and the potential that exists to generate explosive $H_2$ gas if conditions become too basic. In addition to these drawbacks, the present inventors have found that when THMP (as opposed to an isomerization suppression agent in accordance with the present teachings) is used for the suppression of olefin isomerization—particularly when the amount of residual metathesis catalyst is low (e.g., in some embodiments less than about 1000 ppm, in some embodiments less than about 500 ppm, in some embodiments less than about 250 ppm, and in some embodiments less than about 100 ppm)—reclamation of transition metal from the residual metathesis catalyst can be complicated by the distribution of the transition metal (e.g., ruthenium) between multiple phases with no appreciable concentration or convergence of the transition metal into any one phase. By way of example, when THMP is used as an isomerization suppression agent in a metathesis-based method for refining a natural oil feedstock, such as described above, it is found that ruthenium is broadly distributed between a water wash stream on the one hand and a glycerol-containing phase and transesterification products on the other. In some studies, about 50% of the total ruthenium was carried into a water wash stream with the remaining Ru being distributed between a glycerol-containing phase and the transesterification products. While neither desiring to be bound by any particular theory nor intending to limit in any measure the scope of the appended claims or their equivalents, it is presently observed that the difficulty in concentrating a majority of the transition metal into a particular stream when THMP is used as the isomerization suppression agent arises primarily when the amount of ruthenium to be recovered is small (e.g., about 1 wt % or less). By contrast, when a large amount of ruthenium is involved (e.g., about 1 wt % or more) and THMP is used as the isomerization suppression agent, a majority of the ruthenium can be successfully concentrated into an aqueous phase and removed.

In some embodiments, for purposes of simplifying the metal reclamation process, it would be desirable if the metal to be reclaimed (e.g., in some embodiments, ruthenium) were concentrated primarily in one phase and, in some embodiments, if that phase were located downstream in the overall process. Thus, for embodiments in which the isomerization suppression agent has sufficient thermal stability (e.g., a phosphite ester having a sufficiently high molecular weight), such that it can be left in the mixture comprising the olefin metathesis product and carried along for further processing at high temperatures (e.g., 250° C.), a method in accordance with the present teachings provides a further advantage with respect to the use of THMP inasmuch as no aqueous wash is required up front in the process, and the catalyst metal can be more easily concentrated in and recovered from various bottom fractions downstream in the process.

Moreover, thermally stable isomerization suppression agents in accordance with the present teachings have reduced tendency to decompose into lower molecular weight phosphorus-containing compounds (e.g., phosphine, etc.) which could potentially contaminate the metathesis products. In addition, whereas it is oftentimes desirable to wash a suppressant such as THMP out of a metathesis mixture prior to subjecting the mixture to distillation and/or other high-temperature processing in order to avoid introducing the suppressant into hot areas of the process wherein decomposition and/or resultant product and/or recycle stream contamination can occur, the more thermally and hydrolytically stable isomerization suppression agents described herein can be carried through without water washing, which greatly simplifies metathesis-based methods for refining natural oil feedstocks by eliminating the need for (i) a water wash (mixing), (ii) separation (decanter), and (iii) recovery (evaporator).

The following examples and representative procedures illustrate features in accordance with the present teachings, and are provided solely by way of illustration. They are not intended to limit the scope of the appended claims or their equivalents.

EXAMPLES

Example 1

A clean, dry, stainless steel jacketed 5-gal. Parr reactor vessel equipped with a dip tube, overhead stirrer, internal cooling/heated coils, temperature probe, sampling valve, and headspace gas release valve was purged with argon to 15 psig. Soybean oil (SBO, 2.5 kg, 2.9 mol, Costco, MWn=864.4 g/mol, 85 weight % unsaturation as determined by GC, 1 hour argon sparged in 5-gal container) was added into the Parr reactor. The Parr reactor was sealed and the SBO was purged with argon for 2 hours while cooling to 10° C. After 2 hours, the reactor was vented until the internal pressure reached 10 psig. The dip tube valve on the reactor was connected to a 1-butene cylinder (Airgas, CP grade, 33 psig headspace pressure, >99 weight %) and re-pressurized to 15 psig of 1-butene. The reactor was vented again to 10 psig to remove residual argon in the headspace. The SBO was stirred at 350 rpm and 9-15° C. under 18-28 psig 1-butene until 3 mol 1-butene per SBO olefin bond was transferred into the reactor (approximately 2.2 kg 1-butene over approximately 4-5 hours). A toluene solution of [1,3-Bis-(2,4,6-trimethylphenyl)-2-imidazolidinylidene]dichlororuthenium(3-methyl-2-butenylidene)(tricyclohexylphosphine) (C827, Materia) was prepared in Fischer-Porter pressure vessel by dissolving 130 mg catalyst in 30 grams of toluene as a catalyst carrier (10 mol ppm per olefin bond of SBO) and was added to the reactor via the reactor dip tube by pressurizing the headspace inside the Fischer-Porter vessel to 50-60 psig with argon. The Fischer-Porter vessel and dip tube were rinsed with an additional 30 g toluene. The reaction mixture was stirred for 2.0 hours at 60° C. The reaction mixture was allowed to cool to ambient temperature while the gases in the headspace were vented. After the pressure was released, the reaction mixture was transferred to a 3-neck round bottom flask containing 58 g bleaching clay (2% w/w SBO, Pure Flow B80 CG) and a magnetic stir bar. The reaction mixture was treated by stirring at 85° C. under argon. After 2 hours, during which time any remaining 1-butene was allowed to vent, the reaction mixture was allowed to cool to 40° C. and filtered through a fritted glass filter. An aliquot of the product mixture was found by gas chromatographic analysis (following transesterification with 1% w/w NaOMe in methanol at 60° C.) to contain approximately 22 weight % methyl 9-decenoate, approximately 16 weight % methyl 9-dodecenoate, approximately 3 weight % dimethyl 9-octadecenedioate, and approximately 3 weight % methyl 9-octadecenoate (by gc). These results compare favorably with the calculated yields at equilibrium of 23.4 wt % methyl 9-decenoate, 17.9 wt % methyl 9-dodecenoate, 3.7 wt % dimethyl 9-octadecenedioate, and 1.8 wt % methyl 9-octadecenoate.

Example 2

By the general procedures described in example 1, a reaction was performed using 1.73 kg SBO and 3 mol 1-butene/SBO double bond. An aliquot of the product mixture was found by gas chromatographic analysis following transesterification with 1% w/w NaOMe in methanol at 60° C. to contain approximately 24 weight % methyl 9-decenoate, approximately 18 weight % methyl 9-dodecenoate, approximately 2 weight % dimethyl 9-octadecenedioate, and approximately 2 weight % methyl 9-octadecenoate (as determined by gc).

Example 3

By the general procedures described in example 1, a reaction was performed using 1.75 kg SBO and 3 mol 1-butene/SBO double bond. An aliquot of the product mixture was found by gas chromatographic analysis following transesterification with 1% w/w NaOMe in methanol at 60° C. to contain approximately 24 weight % methyl 9-decenoate, approximately 17 weight % methyl 9-dodecenoate, approximately 3 weight % dimethyl 9-octadecenedioate, and approximately 2 weight % methyl 9-octadecenoate (as determined by gc).

Example 4

By the general procedures described in example 1, a reaction was performed using 2.2 kg SBO, 3 mol 1-butene/SBO double bond, and the 60 g of toluene used to transfer the catalyst was replaced with SBO. An aliquot of the product mixture was found by gas chromatographic analysis following transesterification with 1% w/w NaOMe in methanol at 60° C. to contain approximately 25 weight % methyl 9-decenoate, approximately 18 weight % methyl 9-dodecenoate, approximately 3 weight % dimethyl 9-octadecenedioate, and approximately 1 weight % methyl 9-octadecenoate (as determined by gc).

Example 5

A 12-liter, 3-neck, glass round bottom flask that was equipped with a magnetic stir bar, heating mantle, and temperature controller was charged with 8.42 kg of the combined reaction products from examples 1-4. A cooling condenser with a vacuum inlet was attached to the middle neck of the flask and a receiving flask was connected to the condenser. Hydrocarbon olefins were removed from the reaction product by vacuum distillation over the follow range of conditions: 22-130° C. pot temperature, 19-70° C. distillation head temperature, and 2000-160 µtorr pressure. The weight of material remaining after the volatile hydrocarbons were removed was 5.34 kg. An aliquot of the non-volatile product mixture was found by gas chromatographic analysis following transesterification with 1% w/w NaOMe in methanol at 60° C. to contain approximately 32 weight % methyl 9-decenoate, approximately 23 weight % methyl 9-dodecenoate, approximately 4 weight % dimethyl 9-octadecenedioate, and approximately 5 weight % methyl 9-octadecenoate (as determined by gc).

Example 6

A 12-liter, 3-neck round bottom flask that was fitted with a magnetic stir bar, condenser, heating mantle, temperature probe, and gas adapter was charged with 4 liters of 1% w/w NaOMe in MeOH and 5.34 kg of the non-volatile product mixture produced in example 5. The resulting light yellow heterogeneous mixture was stirred at 60° C. After about an hour, the mixture turned a homogeneous orange color (detected pH=11.) After a total reaction time of 2 hours, the mixture was cooled to ambient temperature and two layers were observed. The organic phase was washed twice with 3 L of 50% (v/v) aqueous MeOH, separated, and neutralized by washing with glacial HOAc in MeOH (1 mol HOAc/mol NaOMe) to a detected pH of 6.5, yielding 5.03 kg.

Example 7

A glass, 12 L, 3-neck round bottom flask fitted with a magnetic stirrer, packed column, and temperature controller was charged with the methyl ester mixture (5.03 kg) produced in example 6 and placed in the heating mantle. The column attached to the flask was a 2-inch×36-inch glass column containing 0.16" Pro-Pak™ stainless steel saddles. The distillation column was attached to a fractional distillation head to which a 1 L pre-weighed round bottom flask was fitted for collecting the distillation fractions. The distillation was carried out under vacuum at 100-120 µtorr. A reflux ratio of 1:3 was used for isolating both methyl 9-decenoate (9-DAME) and methyl 9-dodecenoate (9-DDAME). A reflux ratio of 1:3 referred to 1 drop collected for every 3 drops sent back to the distillation column. The samples collected during the distillation, the vacuum distillation conditions, and the 9-DAME and 9-DDAME content of the fractions, as determined by gc, are shown in Table 1. Combining fractions 2-7 yielded 1.46 kg methyl 9-decenoate with 99.7% purity. After collecting fraction 16, 2.50 kg of material remained in the distillation pot: it was found by gc to contain approximately 14 weight % 9-DDAME, approximately 42 weight % methyl palmitate, and approximately 12 weight % methyl stearate.

TABLE 1

| Distillation Fractions # | Head temp. (° C.) | Pot temp. (° C.) | Vacuum (µtorr) | Weight (g) | 9-DAME (wt %) | 9-DDAME (wt %) |
|---|---|---|---|---|---|---|
| 1 | 40-47 | 104-106 | 110 | 6.8 | 80 | 0 |
| 2 | 45-46 | 106 | 110 | 32.4 | 99 | 0 |
| 3 | 47-48 | 105-110 | 120 | 223.6 | 99 | 0 |
| 4 | 49-50 | 110-112 | 120 | 283 | 99 | 0 |
| 5 | 50 | 106 | 110 | 555 | 99 | 0 |
| 6 | 50 | 108 | 110 | 264 | 99 | 0 |
| 7 | 50 | 112 | 110 | 171 | 99 | 0 |
| 8 | 51 | 114 | 110 | 76 | 97 | 1 |
| 9 | 65-70 | 126-128 | 110 | 87 | 47 | 23 |
| 10 | 74 | 130-131 | 110 | 64 | 0 | 75 |
| 11 | 75 | 133 | 110 | 52.3 | 0 | 74 |
| 12 | 76 | 135-136 | 110 | 38 | 0 | 79 |
| 13 | 76 | 136-138 | 100 | 52.4 | 0 | 90 |
| 14 | 76 | 138-139 | 100 | 25.5 | 0 | 85 |
| 15 | 76-77 | 140 | 110 | 123 | 0 | 98 |
| 16 | 78 | 140 | 100 | 426 | 0 | 100 |

Example 8

A reaction was performed by the general procedures described in example 1 with the following changes: 2.2 kg SBO, 7 mol propene/mol SBO double bond, and 200 mg [1,3-Bis-(2,4,6-trimethylphenyl)-2-imidazolidinylidene] dichlororuthenium(benzylidene)(tricyclohexylphosphine) [C848 catalyst, Materia Inc., Pasadena, Calif., USA, 90 ppm (w/w) vs. SBO] at a reaction temperature of 40° C. were used. The catalyst removal step using bleaching clay also was replaced by the following: after venting excess propene, the reaction mixture was transferred into a 3-neck round bottom flask to which tris(hydroxymethyl)phosphine (THMP, 1.0 M in isopropanol, 50 mol THMP/mol C848) was added. The resulting hazy yellow mixture was stirred for 20 hours at 60° C., transferred to a 6-L separatory funnel and extracted with 2×2.5 L deionized H$_2$O. The organic layer was separated and dried over anhydrous Na$_2$SO$_4$ for 4 hours, then filtered through a fritted glass filter containing a bed of silica gel.

Example 9

A reaction was performed by the general procedures described in example 8, except that 3.6 kg SBO and 320 mg C848 catalyst were used. Following catalyst removal, the reaction product from example 9 was combined with that from example 8, yielding 5.12 kg of material. An aliquot of the combined product mixture was found by gas chromatographic analysis following transesterification with 1% w/w NaOMe in methanol at 60° C. to contain approximately 34 weight % methyl 9-decenoate, approximately 13 weight % methyl 9-undecenoate, <1 weight % dimethyl 9-octadecenedioate, and <1 weight % methyl 9-octadecenoate (as determined by gc).

Hydrocarbon olefins were removed from the 5.12 kg of combined reaction product described above by vacuum distillation by the general procedure described in example 5. The weight of material remaining after the volatile olefins were removed was 4.0 kg. An aliquot of the non-volatile product mixture was found by gas chromatographic analysis following transesterification with 1% w/w NaOMe in methanol at 60° C. to contain approximately 46 weight % methyl 9-decenoate, approximately 18 weight % methyl 9-undecenoate, approximately 2 weight % dimethyl 9-octadecenedioate, and approximately 1 weight % methyl 9-octadecenoate (as determined by gc).

Example 10

Two reactions were performed by the general procedures described in example 8, except that for each reaction, 3.1 kg SBO and 280 mg C848 catalyst were used. Following catalyst removal, the reaction products from the two preparations were combined, yielding 5.28 kg of material. An aliquot of the combined product mixture was found by gas chromatographic analysis following transesterification with 1% w/w NaOMe in methanol at 60° C. to contain approximately 40 weight % methyl 9-decenoate, approximately 13 weight % methyl 9-undecenoate, approximately 2 weight % dimethyl 9-octadecenedioate, and approximately 1 weight % methyl 9-octadecenoate (as determined by gc).

Hydrocarbon olefins were removed from the 5.28 kg of combined reaction product by vacuum distillation by the general procedure described in example 5. The weight of material remaining after the volatile olefins were removed was 4.02 kg. An aliquot of the non-volatile product mixture was found by gas chromatographic analysis following transesterification with 1% w/w NaOMe in methanol at 60° C. to contain approximately 49 weight % methyl 9-decenoate, approximately 16 weight % methyl 9-undecenoate, approximately 2 weight % dimethyl 9-octadecenedioate, and approximately 3 weight % methyl 9-octadecenoate (as determined by gc).

Example 11

By the general procedures described in example 10, two metathesis reactions were performed using SBO, 7 mol cis-2-butene/mol SBO double bond, and 220 mg C848 catalyst/kg SBO. Following catalyst removal, the reaction products from the two preparations were combined, yielding 12.2 kg of material. An aliquot of the combined product mixture was found by gas chromatographic analysis following transesterification with 1% w/w NaOMe in methanol at 60° C. to contain approximately 49 weight % methyl 9-undecenoate, approximately 2 weight % dimethyl 9-octadecenedioate, and approximately 1 weight % methyl 9-octadecenoate (as determined by gc).

Hydrocarbon olefins were removed from the 12.2 kg of combined reaction product by vacuum distillation by the general procedure described in example 5. The weight of material remaining after the volatile olefins were removed was 7.0 kg. An aliquot of the non-volatile product mixture was found by gas chromatographic analysis following transesterification with 1% w/w NaOMe in methanol at 60° C. to contain approximately 57 weight % methyl 9-undecenoate, approximately 4 weight % dimethyl 9-octadecenedioate, and approximately 2 weight % methyl 9-octadecenoate (as determined by gc).

Example 12

By the general procedures described in example 1, approximately 7 kg of cross metathesis product was produced by reacting SBO with 3 mol 1-butene/mol SBO double bond using 43 mg C827 catalyst/kg SBO, following catalyst removal with THMP. An initial 2.09 kg portion of the metathesis product was hydrogenated at 136° C. and 400 psig $H_2$ until hydrogen uptake ceased in a one gallon batch autoclave using 105 g of Johnson-Matthey A-7000 Sponge Metal™ catalyst. The resulting mixture was filtered warm (22-55° C.), yielding 1.40 kg filtrate and 350 g of a mixture consisting of the catalyst and the hydrogenated product. The entirety of the catalyst-containing mixture was returned to the one gallon reactor along with a second 2.18 kg portion of the metathesis product and a second hydrogenation reaction was similarly carried out until hydrogen uptake ceased. The catalyst was allowed to settle and the majority of the organic product was decanted and filtered, yielding 1.99 kg filtrate and 380 g catalyst-hydrogenated product mixture. The remaining approximately 3 kg of metathesis product was hydrogenated in two additional batch reactions that in like manner were carried out using the catalyst from the previous reaction, yielding 1.65 kg and 1.28 kg of hydrogenated product, respectively. The total weight of hydrogenated product that was isolated after filtration was 6.32 kg. Aliquots of the hydrogenated product were found by gas chromatographic analysis to contain approximately 30 weight % $C_6$-$C_{18}$ n-paraffins and approximately 70 weight % triglycerides. The relative distribution of the $C_8$-$C_{18}$ n-paraffins contained in the hydrogenated product compares well with the calculated distribution of olefins by carbon number: observed (calculated) 2.3 (0.6) weight % $C_8$, 35.6 (36.2) weight % $C_9$, 30.0 (27.6) weight % $C_{10}$, 0.6 (0.1) weight % $C_{11}$, 22.2 (23.6) weight % $C_{12}$, 3.4 (3.7) weight % $C_{13}$, 0.1 (0.0) weight % $C_{14}$, 4.4 (6.3) weight % $C_{15}$, 0.4 (0.4) weight % $C_{16}$, 0.1 (0.0) weight % $C_{17}$, and 1.0 (1.6) weight % $C_{18}$.

The paraffin components were separated by wiped film evaporation from a 4.84 kg aliquot of the hydrogenated paraffin/triglyceride product. An initial wiped film evaporation was carried out at 75° C., 100 torr, 300 rpm, and condensation temperature of 15° C. using a feed rate of 300 g/h and yielded a condensate that was subjected to a second wiped film evaporation at 125° C., 90 torr, 300 rpm, and condensation temperature of 10° C. to remove the lighter alkanes. The resultant residual liquid was found by gas chromatography to contain the following distribution of n-alkanes: 17.5 weight % $C_7$, 1.7 weight % $C_8$, 31.0 weight % $C_9$, 28.3 weight % $C_{10}$, 0.6 weight % $C_{11}$, 17.4 weight % $C_{12}$, 2.1 weight % $C_{13}$, 0.1 weight % $C_{14}$, 1.2 weight % $C_{15}$, 0.1 weight % $C_{16}$, 0.0 weight % $C_{17}$, and 0.1 weight % $C_{18}$. The material was found to have a heat of combustion of 43.86 MJ/kg (ASTM D3338), less than 1 mg/kg sulfur (ASTM D5453), density of 0.7247 (ASTM D4052), and a final boiling point of 232.3° C. (ASTM D86), indicating the majority of this material would be suitable as a blend stock in a fuel application such as diesel or jet fuel.

Example 13

An oligomerization reaction of 1-olefin/1,4-diene (92 wt % 1-decene, 4.5 wt % 1,4-decadiene, 2 wt % 1,4-undecadiene)

that was produced from the cross metathesis of palm oil with 1-octene was performed on a 550 g scale using 1.1 mol % ethyl aluminum dichloride (1M solution in hexane)/1.1 mol % tert-butyl chloride for 3 hours at 10° C. The reaction mixture was quenched with water and 1M sodium hydroxide solution and stirred until it became colorless. Hexane (300 ml) was added and mixture was transferred to a separatory funnel. The organic layer was washed with water and brine, and then concentrated on a rotary evaporator to remove the hexane. The oligomeric mixture was devolatilized via short path vacuum distillation (100° C. and 5 Torr) and the product distribution was determined to be 97% mixture oligomers by GC/MS. The dynamic viscosity (Brookfield, #34 spindle, 100 rpm, 22° C.) of the sample is 540 cps. The kinematic viscosity for the sample at 40° C. is 232 cSt.

The aforementioned examples utilized the following analytical methods described below:

Volatile products were analyzed by gas chromatography and flame ionization detector (FID). Alkene analyses were performed using an Agilent 6890 instrument and the following conditions: column=Restek Rtx-5, 30 m×0.25 mm (ID)×0.25 μm film thickness; injector temperature=250° C.; detector temperature=280° C.; oven temperature=35° C. starting temperature, 4 minute hold time, ramp rate 12° C./min to 260° C., 8 minute hold time; carrier gas=helium; mean gas velocity=31.3±3.5% cm/sec (calculated); and split ratio=~50:1.

The products were characterized by comparing peaks with known standards, in conjunction with supporting data from mass spectrum analysis (GCMS-Agilent 5973N). GCMS analysis was accomplished with a second Rtx-5, 30 m×0.25 mm (ID)×0.25 μm film thickness GC column, using the same method as above.

Alkane analyses were performed using an Agilent 6850 instrument and the following conditions: column=Restek Rtx-65, 30 m×0.32 mm (ID)×0.1 μm film thickness; injector temperature: 250° C. Detector temperature=350° C.; oven temperature=55° C. starting temperature, 5 minute hold time, ramp rate 20° C./min to 350° C., 10 minute hold time; carrier gas=hydrogen; flow rate=1.0 mL/min; and split ratio=40:1.

The products were characterized by comparing peaks with known standards. Fatty acid methyl ester (FAME) analyses were performed using an Agilent 6850 instrument and the following conditions: column=J&W Scientific, DB-Wax, 30 m×0.32 mm (ID)×0.5 μm film thickness; injector temperature=250° C.; detector temperature=300° C.; oven temperature=70° C. starting temperature, 1 minute hold time, ramp rate 20° C./min to 180° C., ramp rate 3° C./min to 220° C., 10 minute hold time; carrier gas=hydrogen; and flow rate=1.0 mL/min.

The examples above collectively demonstrate the major steps described in the process schemes, showing the production of olefins, paraffins, metathesized triglycerides, unsaturated fatty acid esters and acids, and diacid compounds from natural oils that are useful as chemicals, solvents and fuels blending stocks.

Materials and Methods for Isomerization Suppression Experiments

Unless otherwise indicated, all chemicals were used as received and without drying. Palm oil was obtained from Wilmar International Limited. Kirkland soybean oil was purchased from retail sources. 1-Octene was purchased from Sigma Aldrich. C827 ruthenium catalyst was obtained from Materia, Inc. Trilauryl phosphite (DOVERPHOS® 53), trisnonyl phenyl phosphite (DOVERPHOS® 4), dioleyl hydrogen phosphite (DOVERPHOS® 253), and triisodecyl phosphite (DOVERPHOS® 6) were supplied by Dover Chemical Corporation. TNPP (along with other phosphites) was also supplied by Galata Chemicals. Diethyl phosphite was purchased from Aldrich (98% pure). Trimethyl phosphite was purchased from Aldrich (99+% pure). DEQUEST 0539 and DEQUEST 0520 were obtained from Thermphos International BV.

Unless otherwise specified, all isomerization results were derived from a small scale isomerization (SSI) unit as described below. By way of illustration, taking the amount of terminal-to-internal migration as a representative and non-limiting example, the degree of isomerization can be calculated by first obtaining the quotient of (i) the amount of internal isomers as represented, for example, by the areas under gas chromatography (GC) peaks corresponding to these internal isomers to (ii) the total amount of all isomers—both terminal and internal—as represented, for example, by the areas under the GC peaks corresponding to these isomers, and then multiplying this quotient by 100. Analogous calculations can be performed to determine the amount of internal-to-terminal migration and/or the amount of internal-to-internal migrations.

Example 14

Small Scale Isomerization (SSI) Studies

Metathesized samples were heated to 250° C. for one hour under nitrogen after suppression treatment. Duplicates runs were conducted on both the sample to be tested as well as a control sample which had not been treated. Degree of isomerization was determined by taking the total of isomers of methyl 9-decenoate divided by the total amount of methyl decenoate multiplied by 100.

The small scale isomerization unit includes a cylindrical aluminum block having several holes (e.g., six to eight) drilled therein. The aluminum block is placed on a hot plate and heated to the requisite temperature. Small amounts (typically several grams) of metathesis product are placed in glass tubes, which are then fitted with plastic heads providing an opening for a slight positive pressure of nitrogen to be present above the mixture. After purging the samples for 30 minutes under nitrogen, the mixtures are heated to 250° C. (with or without stirring) for one hour by placing the glass tubes in the opening of the aluminum block. The resulting triacylglycerides (TAGs) are then transesterified with methanol and base and the resulting FAMEs are analyzed by GC. In some embodiments, methyl 9-decenoate is measured vis-à-vis the amount of its internal isomers (if any).

Example 15

Preparation of a Cross-Metathesized Olefin Product

Octenylized palm oil was prepared as follows. At a 3:1 molar ratio, 1-octene (33.33 g) was added to palm oil (50 g) having a peroxide value below 2.0 (which can be obtained, typically, by heating the oil to approximately 200° C. under a $N_2$ sparge to thermally decompose peroxides). As used herein, the mole ratio of cross agent (e.g., 1-octene) to oil relates to the molar ratio of double bond content. In the oil, the double bond content is calculated from the relative ratio of the key fatty acids present (each with its own olefin content), all of which can be readily determined by gas chromatography after transesterification. Thus, in this example, a 3:1 mole ratio refers to having a 3:1 ratio of cross agent double bonds to the total double bonds of the oil. The resultant material was heated with stirring to 60° C. with nitrogen sparging for 30-45 minutes. Once oxygen has been removed, the nitrogen line was pulled up out of the oil into the headspace. The C827 catalyst (2.75 mg, approximately 55 ppm loading) was then added. The reaction was run for two hours with periodic sampling of the oil to determine the extent of conversion of the reaction.

Example 16

Phosphite Ester as Isomerization Suppression Agent

To 25 grams of cross-metathesized palm oil (3:1 octenylized at a loading of 55 ppm C827) was added an approximately 20-fold molar excess of DOVERPHOS® 53 (molar in relation to the amount of C827 present). This 20-fold molar excess relates to the amount of suppression agent added compared directly to the amount (moles) of catalyst present. The addition did not result in any observable separation, which suggested that the added phosphite was soluble in the oil. The mixture was then heated to 90° C. for one hour with stirring. The level of isomerization in the absence of any suppression agent was measured at 5.0% and 5.8% (duplicate runs) using a small scale isomerization (SSI) unit run at 250° C. for one hour. A portion of the suppressed sample was treated with water (approx 4:1 oil:water) and then separated. Both the water-washed and unwashed samples were tested for suppression.

Samples that were taken after the one-hour suppression reaction exhibited levels of isomerization of 0.1% and 0.2% (duplicate runs) after being run in the SSI unit. The water-washed samples exhibited similarly low levels of suppression (0.3% and 0.2%).

Example 17

Phosphite Ester as Isomerization Suppression Agent

A larger-scale reaction analogous to that described in Example 16 above was run using DOVERPHOS® 53 at a 20-fold molar excess over catalyst. A cross-metathesized palm oil (175 grams, 3:1 octenylized at a loading of 55 ppm C827) was added to a 500-mL three-necked, round-bottomed flask fitted with a nitrogen inlet/outlet and a distillation head. The sample was heated and stirred to 90° C. under nitrogen. At temperature, DOVERPHOS® 53 (107.5 microliters) was added to the mixture. The mixture was then heated for one hour at temperature. The heating was then increased to a point where the internal oil temperature was 250° C. A sample was taken at this "zero time" and the flask was then heated under these conditions (with the light olefins distilling) for two hours. Additional samples were taken at 80 and 120 minutes. The samples were all transesterified and then run for isomerization level by GC. The analysis showed that all of the samples (0, 80, and 120 minutes) had isomerization levels less that 0.4 wt %. Typical levels of isomerization of the non-suppressed material under similar conditions were 30+%.

Example 18

Phosphite Ester as Isomerization Suppression Agent

It was found that lowering the overall amount of phosphite (e.g., from a 20-fold molar excess to a 10-fold molar excess) still resulted in good isomerization suppression but at levels somewhat higher than reported in the above examples (e.g., typically up to 1%). A cross-metathesized palm oil (25 grams, 3:1 octenylized) was heated to 90° C. under nitrogen. At approximately 80° C., a 1:1 mixture by weight of DOVERPHOS® 4 in toluene (20 microliters) was added. The toluene was added to cut the overall viscosity of the phosphite being used. After 15 minutes, a sample was taken for SSI testing. A second sample was taken after one hour. Both samples showed significant suppression of isomerization. The results are summarized in Table 2 below.

This example demonstrates the concept that prior dissolution of the isomerization suppression agent can be performed (e.g., by dissolving a phosphite ester in a solvent) and, in some embodiments, may be desirable (e.g., to cut the overall viscosity, better solubilize the phosphite ester, etc).

In this experiment, it was also noted that a reduction in reaction time from 60 minutes of treatment at 90° C. to only 15 minutes gave similar isomerization suppression results. Thus, while neither desiring to be bound by any particular theory nor intending to limit in any measure the scope of the appended claims or their equivalents, it is presently believed that increased solubility in organic systems of an isomerization suppression agent in accordance with the present teachings can result in shorter residence times and/or lower reaction temperatures without substantially affecting the efficacy of isomerization suppression.

Example 19

Low Molecular Weight Phosphite Ester as Isomerization Suppression Agent

A cross-metathesized palm oil (15.1 grams, 1:1 octenylized) was sparged with $N_2$ for 45 minutes. At this time, trimethyl phosphite (60 microliters) was added to the reaction mixture. The mixture was heated with stirring for one hour at 90° C. The isomerization level of this material after reaction in the SSI unit (one hour at 250° C.) was 0.4%. The non-suppressed control was found to undergo 25.9% isomerization when run in SSI, as shown in Table 2 below.

Example 20

Phosphonate as Isomerization Suppression Agent

To 20 grams of a cross-metathesized palm oil (3:1 octenylized) was added DEQUEST® 539 (80 microliters, further diluted from the active ingredient to approximately 1 M), which represented an approximately 100-fold ratio of the phosphonate to the catalyst. The mixture was heated for one hour under nitrogen at 90° C. A sample was then taken for SSI testing. The material was then water washed and another sample was taken of the washed material for SSI. The sample having no water washing showed an isomerization level of 2.0%/2.5% (duplicate runs) versus the unsuppressed sample (40.3% isomerization), as shown by the data in Table 2 below. The water-washed sample gave isomerization levels of 7.6%/7.8% (duplicate runs), which is still lower than the control but not as efficacious as leaving the phosphonates in the metathesized material.

Example 21

Susceptibility of Isomerization Suppression Agent to Distillation

To determine whether an isomerization suppression agent in accordance with the present teachings would distill under typical natural oil refining conditions (e.g., 250° C., 15 mm), DOVERPHOS® 6 (30 g) was charged to a 100-mL, three-necked, round-bottomed flask fitted with a J-KEM® temperature controller probe and a simple distillation head. The pot temperature was set to 275° C. at a reduced pressure of 10 mm Hg. No change in overhead temperature was detected at a pot temperature of 255° C. At a pot temperature of 264° C., the overhead temperature rose over time to 210° C. but no liquid distillate was observed. Reducing the vacuum to 5 mm Hg resulted in a small amount of liquid overhead (215° C. overhead). At 2 mm Hg, a small amount of overhead was collected (242° C. bottoms and 222° C. overhead). A total of 1.5 grams was collected (5% of charge).

Running the same experiment with DOVERPHOS® 4 resulted in no overhead product at a bottoms temperature of 280° C. and a reduced pressure of 2 mm Hg (160° C. overhead). While neither desiring to be bound by any particular theory nor intending to limit in any measure the scope of the appended claims or their equivalents, it is presently believed that heavier phosphite esters (e.g., one or more of the phosphites described above) will likely be stable under typical distillation conditions such as may be encountered in refining natural oils and, therefore, that these materials are not likely to contaminate distallates. This represents a significant advantage over the use of lower molecular weight materials that can decompose and/or co-distill with products under typical refining conditions.

Example 22

Susceptibility of Isomerization Suppression Agent to Transesterification Conditions Five different DOVERPHOS® materials were subjected to transesterification conditions (e.g., methoxide/methanol for one hour at 60° C.) in order to assess their susceptibility to transesterification conditions (e.g., such as might be employed for transesterifying a triacylglyceride fraction to produce one or a plurality of transesterification products, as shown in FIG. 5 and as described above). Two of the five materials cleared up during the reaction (i.e., became monophasic) with DOVERPHOS® 4 apparently having reacted and DOVERPHOS® 253 apparently not having reacted to any significant degree.

Three of the five materials—DOVERPHOS® 53, DOVERPHOS® 6, and DOVERPHOS® 613—did not clear up and remained biphasic. Analysis by GC-MS suggests that a reaction may have occurred although the extent was not quantified. Accordingly, while neither desiring to be bound by any particular theory nor intending to limit in any measure the scope of the appended claims or their equivalents, it is presently believed that in some embodiments, these isomerization suppression agents would emerge in the FAME fraction shown in FIG. 5. Moreover, while neither desiring to be bound by any particular theory nor intending to limit in any measure the scope of the appended claims or their equivalents, it is presently believed that if reaction occurs (such as is apparently the case with DOVERPHOS® 4), some of the reaction products could also end up in the glycerol phase.

Thus, the choice of isomerization suppression agent may be guided by a consideration of the desired ultimate destination for the agent within a particular process scheme. For example, in some embodiments, it is desirable to select an isomerization suppression agent that does not end up contaminating a desired product stream. In some embodiments—particularly though not exclusively those involving metathesis-based methods for refining natural oil feedstocks, as shown in FIG. 5—it is desirable to isolate the olefins formed in the metathesis reaction without contamination from the isomerization suppression agent (e.g., a phosphite ester). In some embodiments, as shown in FIG. 5, subsequent transesterification of the triacylglyceride fraction can provide one or a plurality of transesterification products (e.g., FAMEs and/or other esters) that are substantially devoid of phosphorus contamination as a consequence of the phosphite ester remaining in the distillation bottoms (i.e., not being transesterified) or being hydrolyzed.

TABLE 2

ISOMERIZATION SUPPRESSION RESULTS OF PHOSPHOROUS OXO ACID ESTERS

| Phosphorus Esters | Molar Excess over Catalyst | Isom. (duplicates) | Isom. (Control—non-suppressed run) | Comments |
|---|---|---|---|---|
| DOVERPHOS® 53 | 10 | 0.9, 1.0 (1 hr) | 30.6 (lowest level of isom) | Pretreatment was for one hour at 60° C. |
| DOVERPHOS® 4 (trisnonylphenyl phosphite, TNPP) | 10 | 1.1, 0.8 | 22.7, 28.3 | As above |
| Galata TNPP | 10 | 0.3, 0.5 | 6.5, 8.5 | Change in TNPP provider and in the cross-metathesized oil used |
| Galata TNPP | 3 | 0.7 to 3.5 (four runs) | 15.9, 14.9 | Shear mixing employed |
| Trimethyl Phosphite | 100 | 0.4 | 25.9 | Direct addition to SSI |
| Diethyl Phosphite | 100 | 0.5 | 22.4 | Direct addition to SSI |
| DEQUEST® 539 | 100 | 2.0, 2.5 | 40.3 | Mixture of phosphonate esters |

The entire contents of every document cited herein are hereby incorporated by reference, except that in the event of any inconsistent disclosure or definition from the present specification, the disclosure or definition herein shall be deemed to prevail.

The foregoing detailed description and accompanying drawings have been provided by way of explanation and illustration, and are not intended to limit the scope of the appended claims. Many variations in the presently preferred embodiments illustrated herein will be apparent to one of ordinary skill in the art, and remain within the scope of the appended claims and their equivalents It is to be understood that the elements and features recited in the appended claims may be combined in different ways to produce new claims that likewise fall within the scope of the present invention. Thus, whereas the dependent claims appended below may depend from only a single independent or dependent claim, it is to be understood that these dependent claims can, alternatively, be made to depend in the alternative from any preceding claim—whether independent or dependent—and that such new combinations are to be understood as forming a part of the present specification.

The invention claimed is:
1. A method of refining a natural oil comprising:
providing a feedstock comprising a natural oil;
reacting the feedstock in the presence of a metathesis catalyst to form a metathesized product comprising olefins, esters and residual metathesis catalyst;

treating the residual metathesis catalyst with an isomerization suppression agent comprising a phosphite ester to passivate at least a portion of the residual metathesis catalyst;

separating the olefins in the metathesized product from the esters in the metathesized product; and transesterifying the esters in the presence of an alcohol to form a transesterified product.

2. The method of claim 1 wherein the natural oil is selected from the group consisting of canola oil, rapeseed oil, coconut oil, corn oil, cottonseed oil, olive oil, palm oil, peanut oil, safflower oil, sesame oil, soybean oil, sunflower oil, linseed oil, palm kernel oil, tung oil, jatropha oil, mustard oil, camelina oil, pennycress oil, hemp oil, algal oil, castor oil, lard, tallow, poultry fat, yellow grease, fish oil, tall oils, and combinations thereof.

3. The method of claim 1 wherein the phosphite ester comprises a structure $P(OR^1R^2R^3)_3$, wherein $R^1$, $R^2$, and $R^3$ are alike or different and are each independently selected from the group consisting of substituted or unsubstituted $C_1$-$C_{100}$ alkyl, substituted or unsubstituted aryl, and combinations thereof, and wherein covalent bonds may optionally exist between two or more of $R^1$, $R^2$, and $R^3$, such that when two or more of $R^1$, $R^2$, and $R^3$ are taken together, a bidentate or tridentate ligand to phosphorous is formed.

4. The method of claim 3 wherein the phosphite ester is selected from the group consisting of aryl organophosphites, alkyl organophosphites, aryl-alkyl mixed organophosphites, and combinations thereof.

5. The method of claim 3 wherein the phosphite ester is selected from the group consisting of trisnonylphenyl phosphite, diphenyl phosphite, triphenyl phosphite, phenyl diisodecyl phosphite, diphenyl isodecyl phosphite, diphenyl isooctyl phosphite, tetraphenyl dipropyleneglycol diphosphite, poly (dipropyleneglycol) phenyl phosphite, $C_{12}$-$C_{15}$ alkyl bisphenol A phosphite, $C_{10}$ alkyl bisphenol A phosphite, triisodecyl phosphite, tris(tridecyl)phosphite, trilauryl phosphite, tris(dipropylene glycol) phosphite, dioleyl hydrogen phosphite, tris(2,4-di-tert-butylphenyl)phosphite, distearyl pentaerythritol diphosphite, distearyl pentaerythritol diphosphite, bis(2,4-dicumylphenyl)pentaerythritol diphosphite, dodecyl nonylphenol phosphite blend, triisotridecyl phosphite, 2-ethylhexyl diphenyl phosphite, tetraphenyl dipropyleneglycol diphosphite, phenyl neopentylene glycol phosphite, heptakis (dipropyleneglycol) triphosphite, trilauryl trithio phosphite, diphenyl tridecyl phosphite, tris (dipropyleneglycol) phosphite, poly 4,4' isopropylidenediphenol-C10 alcohol phosphite, 4,4' isopropylidenediphenol-C12-15 alcohol phosphite, and combinations thereof.

6. The method of claim 1 wherein the phosphite ester is added in a molar excess relative to the residual metathesis catalyst.

7. The method of claim 6 wherein the molar excess is at least 2 to 1.

8. The method of claim 6 wherein the molar excess is at least 5 to 1.

9. The method of claim 1 further comprising treating the feedstock, prior to reacting the feedstock in the presence of the metathesis catalyst, to diminish catalyst poisons in the feedstock.

10. The method of claim 9 wherein the feedstock is chemically treated through a chemical reaction to diminish the catalyst poisons.

11. The method of claim 9 wherein the feedstock is heated to a temperature greater than 100° C. in an absence of oxygen and held at the temperature to diminish the catalyst poisons.

12. The method of claim 1 wherein the metathesis catalyst is dissolved in a solvent.

13. The method of claim 12 wherein the solvent comprises toluene.

14. The method of claim 1 further comprising oligomerizing the olefins to form a material selected from the group consisting of poly-alpha-olefins, poly-internal-olefins, mineral oil replacements, biodiesel, and combinations thereof.

15. The method of claim 1, further comprising: separating glycerin from the transesterified product through a liquid-liquid separation; washing the transesterified product with water after separating the glycerin to further remove the glycerin; and drying the transesterified product after the washing to separate the water from the transesterified product.

16. The method of claim 15 further comprising distilling the transesterified product to separate a specialty chemical selected from the group consisting of an ester of 9-decenoic acid, an ester of 9-undecenoic acid, an ester of 9-dodecenoic acid, and combinations thereof.

17. The method of claim 16 further comprising hydrolyzing the specialty chemical, thereby forming an acid selected from the group consisting of: 9-decenoic acid, 9-undecenoic acid, 9-dodecenoic acid, alkali metal salts thereof, alkaline metal salts thereof, and combinations thereof.

18. The method of claim 1 further comprising reacting the transesterified product with itself to form a dimer.

19. The method of claim 1 wherein the reacting comprises self-metathesis of the natural oil.

20. The method of claim 1 wherein the feedstock further comprises a low-molecular-weight olefin and wherein the reacting comprises cross-metathesis between the natural oil and the low-molecular-weight olefin.

21. The method of claim 20 wherein the low-molecular weight olefin comprises a $C_2$-$C_{14}$ olefin that comprises a terminal double bond.

22. The method of claim 21 wherein the low-molecular-weight olefin comprises a material selected from the group consisting of ethylene, propylene, 1-butene, 2-butene, and combinations thereof.

23. The method of claim 21 wherein the low-molecular-weight olefin comprises at least one branched olefin having a carbon number between 4 and 10.

* * * * *